(12) United States Patent
Tanaka

(10) Patent No.: US 7,307,745 B2
(45) Date of Patent: Dec. 11, 2007

(54) WEB-BASED PRINT SERVER AND CLIENT

(75) Inventor: Mitsuharu Tanaka, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 778 days.

(21) Appl. No.: 10/327,137

(22) Filed: Dec. 24, 2002

(65) Prior Publication Data

US 2003/0137691 A1    Jul. 24, 2003

(30) Foreign Application Priority Data

Jan. 21, 2002  (JP)  .............................. 2002-011462
Jan. 21, 2002  (JP)  .............................. 2002-011467

(51) Int. Cl.
*G06F 3/12*    (2006.01)

(52) U.S. Cl. ..................... 358/1.15; 358/1.16; 358/1.13

(58) Field of Classification Search ............... 358/1.15, 358/1.13, 1.16; 705/62; 400/61; 707/1
See application file for complete search history.

(56) References Cited

U.S. PATENT DOCUMENTS 5,805,777 A * 9/1998 Kuchta ....................... 358/1.13
6,089,765 A * 7/2000 Mori ........................... 400/61
6,396,593 B1 * 5/2002 Laverty et al. ............. 358/1.15
6,906,812 B2 * 6/2005 Koakutsu et al. .......... 358/1.13
2003/0076526 A1 * 4/2003 Gopalan .................... 358/1.15
2003/0088518 A1 * 5/2003 Kirk et al. .................... 705/62

* cited by examiner

*Primary Examiner*—Aung S. Moe
*Assistant Examiner*—Vincent Rudolph
(74) *Attorney, Agent, or Firm*—Fitzpatrick, Cella, Harper & Scinto

(57) ABSTRACT

A printing process of print target data downloaded from a web server using a plug-in, which can be run from a browser for accessing data held in the web server, can be easily realized. In an information processing apparatus for downloading print target data from a web server unit and controlling a printing process of the downloaded print target data, both print target data prepared in the web server unit and printing setting information containing a print layout type of the print target data are downloaded. A plug-in capable of being run from a browser is employed to make a drawing of the downloaded print target data based on the print layout type in the printing setting information, and the drawing data is output to a printer driver adapted for a printer via a drawing section of the information processing apparatus for creation of print data to be printed by the printer.

5 Claims, 30 Drawing Sheets

PRINT — 802
RE-DOWNLOAD — 803
805
RE-DOWNLOAD AND PRINT — 804

FIG.10

Web CONTENTS PRINTING

PRINTING IS PERFORMED UNDER THE FOLLOWING SETTING.

PRINT EXAMPLE

PRINTER NAME (N): ABC  1001

SHEET SIZE: BUSINESS CARD FOR BJ

NUMBER OF PRINTS: 1

SET PREDETERMINED SHEETS ON "ABC" PRINTER AND SELECT "PRINT".

SELECT "SETTING CHANGE" IF ANY CHANGE.

Ver.1.0.0.0

PRINT  1002
SETTING CHANGE  1003
CANCEL  1004

FIG.11

| PAGE SETTING | FINISH | SHEET FEED | PRINT QUALITY |

FAVORITE (F): sample1

▽ PRINTING

DOCUMENT SIZE (S): A4 ▽

OUTPUT SHEET SIZE (Z): A4 ▽

NUMBER OF PRINTS (C): 1 (1~2000)

PRINT ORIENTATION (T): ● PORTRAIT ○ LANDSCAPE

PAGE LAYOUT (L): 1 PAGE /SHEET (STANDARD) ▽

☐ DESIGNATE MAGNIFICATION (M): 100 % (50~200)

☐ STAMP (W): CONFIDENTIAL ▽

A4 -> A4 (MAGNIFICATION: AUTO)

CONFIRM SETTING (V)

USER DEFINED SHEET (U)... | PAGE OPTION (N)... | STAMP EDIT (I)...

OK | CANCEL | UPDATE(A) | RETURN TO STANDARD (R) | HELP

FIG.15

| | |
|---|---|
| LAYOUT TYPE NAME | 10 BUSINESS CARDS |
| SHEET SIZE (HORIZONTAL) | 21000 |
| SHEET SIZE (VERTICAL) | 29700 |
| DIVIDED SECTION SIZE (HORIZONTAL) | 9100 |
| DIVIDED SECTION SIZE (VERTICAL) | 5500 |
| NUMBER OF DIVIDED SECTIONS (HORIZONTAL) | 2 |
| NUMBER OF DIVIDED SECTIONS (VERTICAL) | 5 |
| OFFSET (HORIZONTAL) | 1400 |
| OFFSET (VERTICAL) | 1100 |
| GAP (HORIZONTAL) | 0 |
| GAP (VERTICAL) | 0 |
| PRINT EXAMPLE IMAGE NAME | printexample.bmp |

FIG.18

| | |
|---|---|
| LAYOUT TYPE NAME | 10 BUSINESS CARDS |
| SHEET SIZE (HORIZONTAL) | 21000 |
| SHEET SIZE (VERTICAL) | 29700 |
| DIVIDED SECTION SIZE (HORIZONTAL) | 9100 |
| DIVIDED SECTION SIZE (VERTICAL) | 5500 |
| NUMBER OF DIVIDED SECTIONS (HORIZONTAL) | 2 |
| NUMBER OF DIVIDED SECTIONS (VERTICAL) | 5 |
| OFFSET (HORIZONTAL) | 1400 |
| OFFSET (VERTICAL) | 1100 |
| GAP (HORIZONTAL) | 0 |
| GAP (VERTICAL) | 0 |
| PRINT EXAMPLE IMAGE NAME | printexample.bmp |
| FIT TYPE | MAXMUM FIT |
| EXTENSION AMOUNT | 300 |

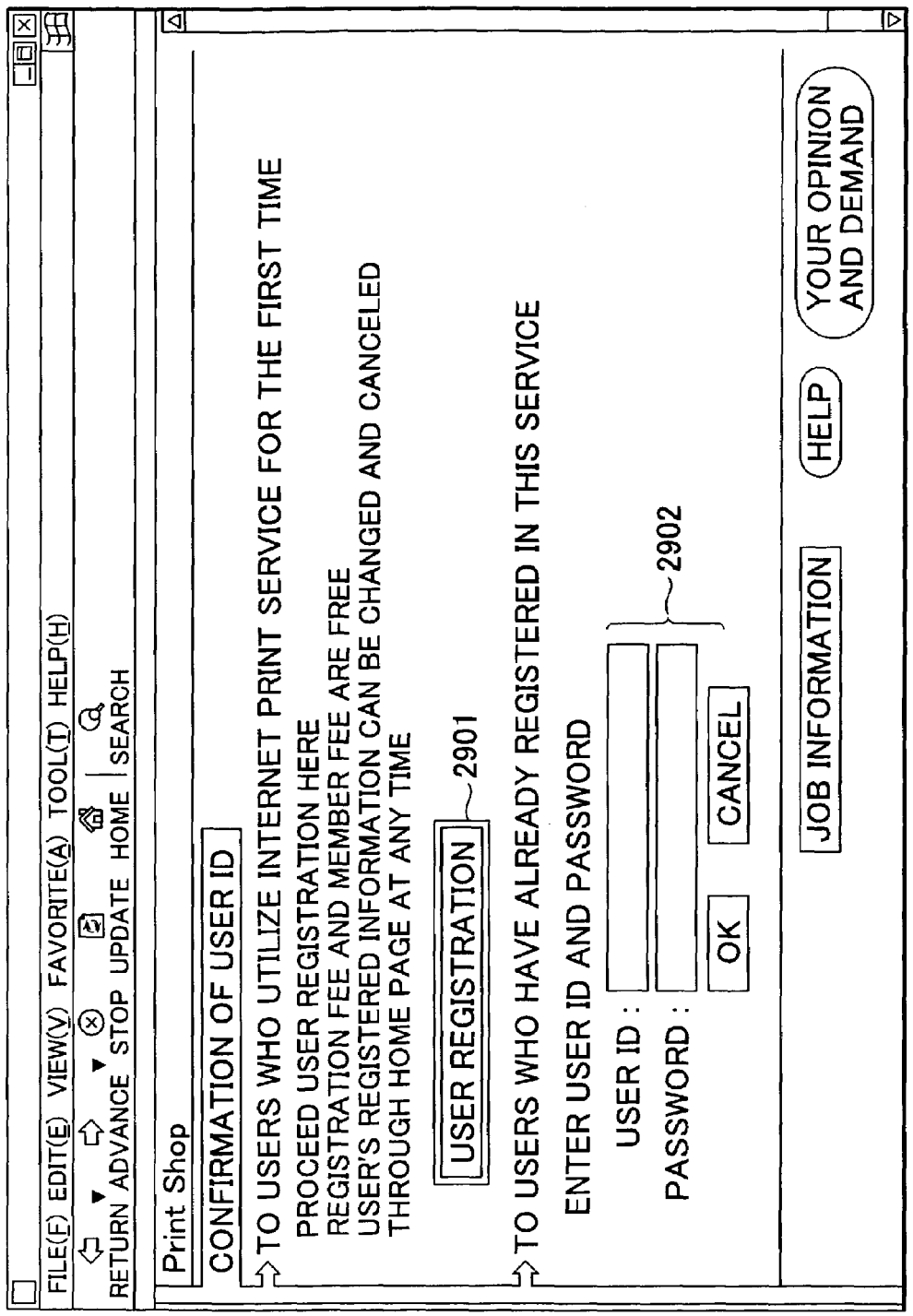

FIG.30

```
FILE(F)  EDIT(E)  VIEW(V)  FAVORITE(A)  TOOL(T)  HELP(H)
 ⇦   ▶   ⇧   ⊗   ↻       ⇩      ⌂      🔍
RETURN ADVANCE STOP UPDATE HOME  SEARCH
```

Print Shop                                                              MR.TOMOHIRO HOSOI

PRINTING DETAILED SETTING

PRINTING SHOP : BUSINESS CARD PRINTING-OUT SHOP  [DISPLAY OF INFORMATION]

↪ NUMBER OF PRINTS

TYPE ORDINARY MONOCHROME PRINTING OF BUSINESS CARDS
NUMBER OF PRINTS [ 1 ] SET(S) (1 SET = 100) [PREVIEW]

DESIGNATE NUMBER OF PRINTS ON CONDITION OF ONE SET BEING 100 PRINTS.
(ENTER HALF-SIZE NUMERAL)
ANY NUMBER IN RANGE OF 1 – 999 SETS CAN BE ENTERED.

[CANCEL]

ORDERED CARDS ARE PRINTED IN "BUSINESS CARD PRINTING-OUT SHOP"

↪ DELIVERY SERVICE

USER WHO WANT TO UTILIZE DELIVERY SERVICE IS REQUESTED TO SELECT "UTILIZE DELIVERY SERVICE" AND ENTER DESTINATION.
WHEN NOT UTILIZING DELIVERY SERVICE, PLEASE TAKE IN MIND THAT PRINTED CARDS ARE DELIVERED AT SHOP.

[UTILIZE DELIVERY SERVICE ▽]

| ADDRESS | ZIP CODE (7 DIGITS) [ ]-[ ]  [KANAGAWA-KEN ▽]<br>TO, DO, FU AND KEN<br>DO NOT USE KATAKANA IN ONE BYTE<br>SHI, CHO, SON AND ADDRESS<br>[KAWASAKI-SHI, NAKAHARA-KU]<br>NAME OF APARTMENT AND ROOM NUMBER |
|---|---|
| NAME OF RECIPIENT | FAMILY NAME [ ]  FIRST NAME [ ] |
| PHONE NUMBER | [ ]-[ ]-[ ]  (ONE-BYTE NUMERALS) |

```
FILE(F)  EDIT(E)  VIEW(V)  FAVORITE(A)  TOOL(T)  HELP(H)
RETURN  ADVANCE  STOP  UPDATE  HOME  SEARCH
```

PRINT SHOP                                                    MR. TOMOHIRO HOSOI

→ CHARGE ESTIMATION

→ ESTIMATE FOR TOTAL OF CHARGES
PLEASE CONFIRM THAT DETAILS OF DESTINATION HAVE NO ERRORS.
IF ANY ERROR, CLICK <<RETURN BUTTON BELOW AND REENTER TRUE DATA

| PRINTING SHOP | BUSINESS CARD PRINTING-OUT SHOP | DISPLAY OF INFORMATION |
|---|---|---|
| PRINTING CHARGE | ORDINARY MONOCHROME PRINTING OF BUSINESS CARDS 1 SET (100 PRINTS) | ¥ 980 |
| | PREVIEW | |
| DELIVER SERVICE | DELIVERED TO DESIGNATED ADDRESS | ¥ 400 |
| DESTINATION | ZIP CODE 211-0021<br>KANAGAWA-KEN<br>KAWASAKI-SHI ××××-×-×××<br>××××<br>×××-×××××-×××× | |
| TOTAL CHARGE (INCLUDING CONSUMPTION TAX) | | ¥1,449 |

→ SELECTION OF PAYMENT METHOD
SELECT DESIRED PAYMENT METHOD
PAYMENT METHOD : [ MUST BE SELECTED ▽] ～3101

COMMUNICATION COLUMN FROM USERS : (ENTER ABOUT 100 CHARACTERS OR LESS)

[                    ]

[<<RETURN]  [CANCEL]  [ORDER]

WEB-BASED PRINT SERVER AND CLIENT

BACKGROUND OF THE INVENTION

1. Field of the Invention

The present invention relates to an information processing apparatus, an information processing method, and a printing control program for controlling printing of document data on a web server unit.

2. Description of the Related Art

When document data stored in a web server unit is to be printed by a printer connected to a client unit, it is conventional to hold the document data on the web server unit as a page to be viewed, which is in the format of, e.g., HTML, and which is capable of being downloaded, to access the web server unit from a browser in the client unit for displaying the viewed page, and to issue an instruction to download the document data to be printed from the viewed page so that the document data is downloaded to the client unit. Then, a dedicated application capable of processing the document data is run in response to a user instruction and the document data is printed by utilizing a printing function provided in the dedicated application.

Also, a sheet size, such as a business-card size, not supported by general printers is handled as a user-defined sheet size. In that case, business cards are printed one by one, and therefore it takes a long time to complete the printing process. The time required for the printing process can be cut down by arranging 10 business cards on an A4-sized sheet and then printing it. This solution, however, requires document data to be created such that 10 business cards are arranged on an A4-sized sheet. In other words, rearranging the downloaded document data to array 10 business cards on an A4-sized sheet with the dedicated application imposes on users a load comparable to that required for creating new document data from the beginning, which is inconvenient. An alternative solution is to prepare the document data corresponding to 10 business cards in the web server unit. However, preparing the document data corresponding to various layouts in the web server unit is disadvantageous in that the memory efficiency is reduced and the burden imposed on a supervisor, such as maintenance supervisor of the web server unit, is increased.

In conventional systems, unless an application capable of processing document data stored in a web server unit is installed in a client unit, the document data stored in the web server unit cannot be printed by a printer connected to the client unit.

Also, when the client unit is connected to the Internet via a low-rate connection means, such as a dialup connection through a modem, a problem arises in that a long time is taken for the download process (hereinafter referred to also as a "transfer") in which the size of the document data to be downloaded is large, and if the transfer is interrupted, the transfer must be performed again from the start. Although there is a file transfer application for enabling the transfer to be interrupted and resumed, users must purchase and install such an application by themselves, which is troublesome.

Further, in the case of printing wherein one type of document data is arranged in plural, as with the printing of business cards, if print target data comprising an array of plural sets of document data is prepared in the web server unit, the amount of print target data to be downloaded is increased and a long time is taken for the data transfer. Another problem is that conventional processes do not deal with changing a print layout, so another document data must be downloaded again which is inconvenience.

SUMMARY OF THE INVENTION

The present invention was conceived and developed in view of the problems in the state of the art, and is intended to provide a scheme for printing document data residing in a web server unit by a printer associated with a client computer.

A first object of the present invention is to easily realize a printing process for print target data, which has been downloaded from a web server, by using a plug-in that can be booted up or run from a browser for accessing data in the web server.

A second object of the present invention is to, even when a print layout designated by a web server is changed, easily realize a printing process using the print layout by making print target data, which is downloaded from the web server, correspond with document data and preparing printing setting information, including the print layout, separately from the print target data.

A third object of the present invention is to, when carrying out a printing process for print target data, which has been downloaded from a web server, by using a plug-in that can be booted up from a browser for accessing data in the web server, realize the printing process of the print target data stored in a predetermined storage area when inputting of a reprint instruction from the browser is allowed and reprinting is performed.

A fourth object of the present invention is to create, in a client unit, a shortcut icon for instructing a printing process for print target data, which has been downloaded from a web server, and to link the shortcut icon with a displayed page, which can be read by a browser and indicates the print target data having been downloaded and stored, so that reprinting can be realized without downloading the print target data again from the web server.

To achieve the above objects, according to a method of first aspect of the present invention, in an information processing apparatus for downloading print target data from a web server unit and controlling a printing process of the downloaded print target data, both print target data prepared in the web server unit and printing setting information containing a print layout type of the print target data are downloaded. A plug-in capable of being booted up from a browser is employed to generate drawing data of the downloaded print target data based on the print layout type in the printing setting information, and the drawing data is outputted to a drawing section of the information processing apparatus to be printed by a printer. The drawing data is outputted to a printer driver adapted for the printer, via the drawing section, for generation of print data.

Preferably, the method of the present invention further includes a layout-type designating step of designating the print layout type via a browser display screen downloaded from the web server unit, wherein the downloaded printing setting information contains the print layout type designated in the layout-type designating step.

Preferably, whenever printing of the print target data is instructed via the browser display screen, the print target data stored in a predetermined storage area is read and subjected to a drawing process, and the drawing data is outputted via the drawing section to the printer driver adapted for the printer, which generates the print data.

Preferably, the method of the present invention further comprises a shortcut creating step of creating a shortcut icon associated with a structured document of the browser display screen, which includes a tag to boot up the plug-in, wherein execution of the shortcut icon causes the browser to display the browser display screen.

Further, the above objects may be achieved with an information processing apparatus for realizing the above method, a printing control program for realizing the above method in an information processing apparatus, and a storage medium storing the printing control program.

To achieve the above objects, according to a method of a second aspect of the present invention, in an information processing apparatus having a web server function of transmitting data in response to an instruction from a client unit that includes a browser, instructions of a document type to be locally printed, edited details, and a print layout type are inputted via the browser in the client unit, and a plug-in that may be invoked from the browser in the client unit is transmitted to the client unit to be registered therein. In response to the inputted instructions, the plug-in registered in the client unit is employed to prepare print target data capable of being subjected to a printing process, printing setting information containing a print layout type, and a browser display screen, which includes an instruction described so as to read out the plug-in when printing the print target data. Download information including the prepared print target data, the printing setting information containing the print layout type of the print target data, and the browser display screen is transmitted to the client unit. The plug-in is invoked from the browser display screen displayed on the client unit via data transmission.

Also, the above objects can be achieved with an information processing apparatus for realizing the above method and a printing control program for realizing the above method in an information processing apparatus.

Thus, according to the present invention, in an information processing apparatus for downloading print target data from a web server unit and controlling a printing process of the downloaded print target data, since both print target data prepared in the web server unit and printing setting information containing a print layout type of the print target data are downloaded, a plug-in capable of being run from a browser is employed to make a drawing of the downloaded print target data based on the print layout type in the printing setting information, and the drawing data is output to a drawing section of the information processing apparatus to be printed by a printer, a printing process of the print target data downloaded from the web server unit can easily be realized using the plug-in that can be run from the browser for accessing data held in the web server unit.

Also, since the print layout type is designated via a browser display screen downloaded from the web server unit, and the printing setting information containing the designated print layout type is downloaded separately from the print target data, the printing process using a changed print layout can be easily realized even when the print layout capable of being designated on the web server unit is changed.

Further, since a user is prompted to select an output printer via a first dialog screen produced in response to an instruction from the plug-in, the output printer can be designated from the plug-in without using a dedicated application.

Moreover, whether the selected printer driver supports an extended API is determined when a change of printing setting is instructed via the first dialog screen, produced in response to the instruction from the plug-in. When the printer driver supports the extended API, a second dialog screen including printing setting obtained using the extended API is produced. Therefore, the user is no longer required to open a property dialog screen provided by the printer driver each occurrence of the printing setting and to input detailed setting. As a result, only necessary setting items are provided, so the user can readily select and instruct those items.

It is not only possible to realize the printing process of the print target data downloaded from the web server unit using the plug-in that can be run from the browser for accessing data held in the web server unit, but also to allow inputting of a reprinting instruction from the browser for realizing the printing process of the print target data stored in a predetermined storage area at the time of reprinting.

Since the method of the present invention further comprises a shortcut creating step of creating a shortcut icon associated with a structured document of the browser display screen, including a tag to run the plug-in, the user can always run the plug-in to output drawing data for printing by double-clicking the shortcut icon to run.

The browser display screen includes printing instruction means and re-download instruction means, and when re-download is instructed by the re-download instruction means, the downloading step re-downloads the print target data from the web server unit. Therefore, the print target data can be downloaded again from the web server unit and used for reprinting in response to an instruction from the user without using the print target data that has been already downloaded.

Furthermore, the method of the present invention further comprises an icon changing step of changing an image of the shortcut icon to an image of a download incompletion icon having a different design, while the print target data is being re-downloaded in the downloading step. Therefore, the user can visually recognize the stage in which the print target data is under download and is not yet prepared.

Other features and advantages of the present invention will be apparent from the following description of the preferred embodiments taken in conjunction with the accompanying drawings, in which like reference characters designate the same or similar parts throughout the figures thereof.

BRIEF DESCRIPTION OF THE DRAWINGS

FIG. 10 shows one example of a dialog screen displayed when instructing printing of the downloaded print target data, for selecting an output printer.

FIG. 11 shows one example of a property dialog screen displayed when setting change is selected on a printing instruction dialog screen, for instructing printing setting of a printer driver.

FIG. 15 shows details of printing setting information downloaded to the client unit.

FIG. 18 shows details of printing setting information downloaded to the client unit.

FIG. 29 shown one example of a browser display screen for executing user authentication when order printing is selected.

FIG. 30 shows one example a browser display screen for setting print details when order printing is selected.

FIG. 31 shows one example a browser display screen for displaying charge estimation and selecting a payment method when order printing is selected.

DESCRIPTION OF THE PREFERRED EMBODIMENTS

Figure 1:
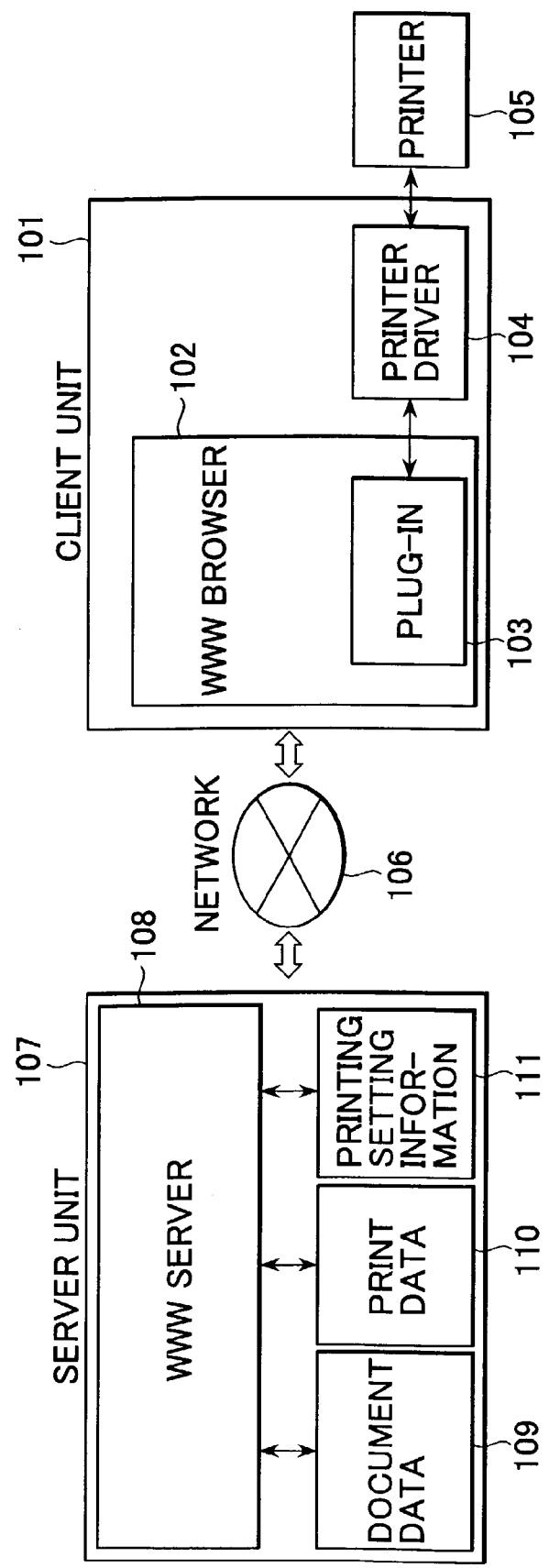
FIG. 1 is a system block diagram of a document printing system according to one embodiment of the present invention.

A preferred embodiment of the present invention will be described below with reference to the accompanying drawings. FIG. 1 is a system block diagram of an information processing apparatus according to one preferred embodiment of the present invention.

Referring to FIG. 1, numeral 101 denotes a client unit according to one embodiment of a document printing apparatus of the present invention. The client unit 101 is connected to a server unit 107 via a network 106, such as the Internet.

Numeral 102 denotes a WWW (World Wide Web) browser (hereinafter also referred to simply as a "browser") operating in the client unit 101, which is represented by Internet Explorer produced by Microsoft (USA) or Netscape Navigator produced by Netscape (USA). Generally, such a browser is installed in PCs and is able to access web contents in a web server. Therefore, if printing can be instructed from the browser using a plug-in, convenience in use is improved. The WWW browser 102 has the functions of interpreting a file which is described in HTML (Hyper Text Markup Language) and is obtained from a WWW server 108 in the server unit 107 via the network 106, such as the Internet, and displaying the file on a display (CRT 201 described later) of the client unit 101.

Numeral 103 denotes a function add-on means (hereinafter also referred to as a "plug-in") for extending the function of the WWW browser 102. When there is a description designating execution of the plug-in 103 during interpretation of an HTML file by the WWW browser 102, the plug-in 103 corresponding to the contents of the description is run and executed by the WWW browser 102. The plug-in 103 according to the present invention is able to, as described later, convert print target data obtained from the web server into drawing functions, to create a shortcut icon, and to instruct creation of a dialog screen.

Numeral 104 denotes a printer driver that is requested to execute printing from the plug-in 103 according to the present invention via an operating system (OS). The printer driver 104 interprets printing commands received from the plug-in 103 via the OS and executes a print data creating process of creating print data interpretable by a printer 105.

Numeral 109 denotes document data stored in the server unit 107. When the WWW browser 102 in the client unit 101 requests display of the document data 109 to the WWW server 108 in the server unit 107 via the network 106, the WWW server 108 prepares an HTML file for displaying the document data 109 in the server unit 107 and sends it to the WWW browser 102 via the network 106. The WWW browser 102 can display the document data 109 on the display of the client unit 101 by displaying the sent HTML file on the display.

Numeral 110 denotes print target data. The print target data 110 is stored in the web server 108 in correspondence to the document data for which printing is instructed. Numeral 111 denotes printing setting information that includes, e.g., a print layout type instructed from the client that is created in response to each printing instruction. When one type of document data displayed by the WWW browser 102 is selected, the layout type is designated, and printing is instructed, the printing commands are sent to the WWW server 108 via the network 106 and the print target data 110 is created from the document data 109 in the WWW server 108. The printing setting information corresponding to the created print target data and the designated layout type is sent from the server unit 107 to the client unit 101 by the plug-in 103 and the WWW server 108, and then printing is performed by the plug-in 103 based on the printing setting information.

Figure 2:
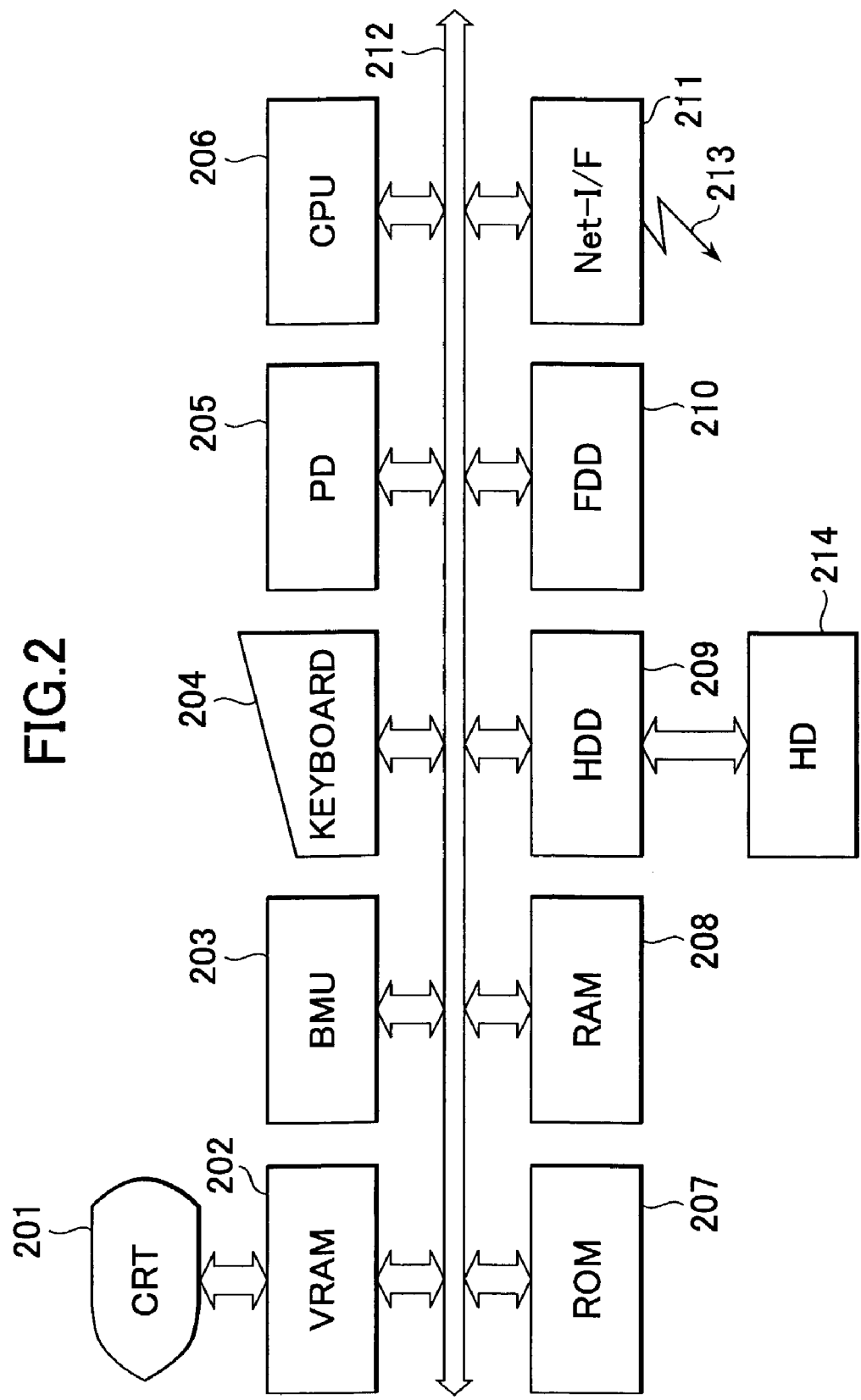
FIG. 2 is a block diagram of an information processing apparatus according to the one embodiment of the present invention.

FIG. 2 is a block diagram of an information processing apparatus corresponding to the client unit 101 according to the preferred embodiment of the present invention.

Referring to FIG. 2, numeral 201 denotes a CRT (display) 201 for displaying, on its display screen, not only documents, figures, images and other edit information during editing, but also icons, messages, menus, and other user interface information. Numeral 202 denotes a VRAM in which an image displayed on the display screen of the CRT 201 is drawn. Image data created in the VRAM 202 is transferred to the CRT 201 in conformity with predetermined protocols, whereby the image is displayed on the CRT 201. Numeral 203 denotes a bit move unit (BMU) for controlling data transfer between memories (e.g., the VRAM 202 and another memory) and between a memory and each I/O device (e.g., a network interface 211). A keyboard 204 has various keys for inputting a document, etc. A pointing device (PD) 205 is used to instruct, e.g., any of icons, menus, and other objects displayed on the display screen of the CRT 201.

Numeral 206 denotes a CPU for controlling various devices connected to the CPU in accordance with control programs stored in a ROM 207, a hard disk, or a floppy disk. The ROM 207 holds various control programs and data. A RAM 208 has a work area for the CPU 206, a data save area in error processing, a load area for the control programs, etc. A hard disk drive (HDD) 209 controls access to a hard disk (HD) 214. The hard disk 214 stores the various control programs executed in the information processing apparatus and various contents held therein. For example, a hard disk of the client unit 101 stores the browser 102, the plug-in 103, and the printer driver 104, while a hard disk of the server unit 107 stores the web server 108, the document data 109, the print target data 110 and the printing setting information 111. A floppy disk drive (FDD) 210 controls access to the floppy disk. A network interface (Net-I/F) 211 enables the apparatus to communicate with another information processing apparatus, the printer, etc. via a network 213 (corresponding to 106 in FIG. 1). Numeral 212 denotes a CPU bus including an address bus, a data bus, and a control bus. A control program can be provided to the CPU 206 from the ROM 207, the hard disk and the floppy disk, or from another information processing apparatus, etc. via the network 213.

Note that FIG. 2 is a block diagram for explaining a hardware configuration of a general information processing apparatus. The server unit 107 has a similar configuration in addition to the client unit 101.

Figure 32:
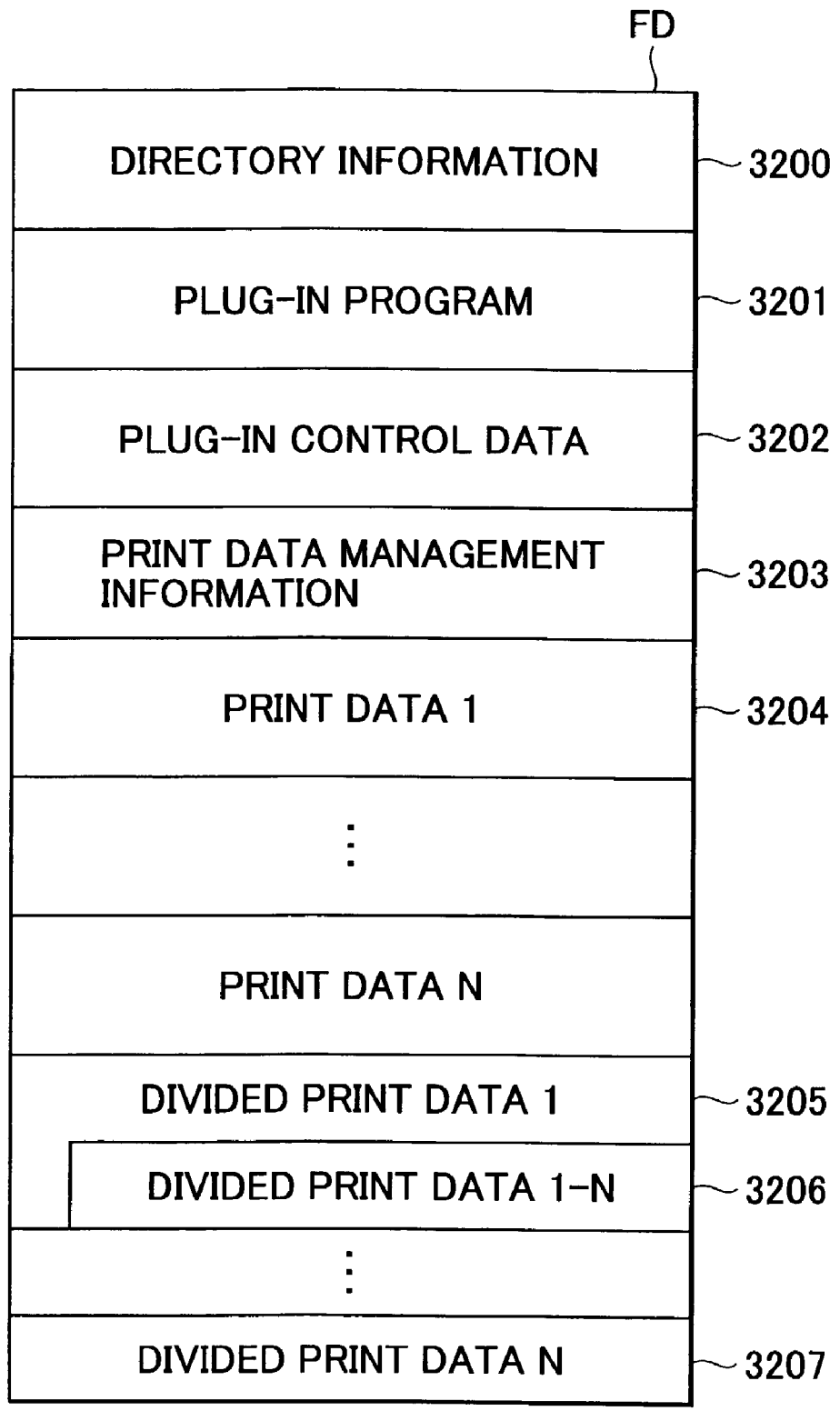
FIG. 32 shows one example a memory map for a memory medium storing a control program including the plug-in program according to the present invention.

FIG. 32 shows one example a memory map for a floppy disk storing a control program. As a matter of course, a floppy disk and another memory medium storing a control program also constitutes the present invention. While modules described below are generally stored in the hard disk, this embodiment is described in connection with a memory map for a floppy disk.

Referring to FIG. 32, an area 3200 for storing directory information holds information indicating storage areas for modules 3201 to 3207. Numeral 3201 denotes a document printing plug-in program that is invoked in accordance with a description in the HTML file read by the browser. A description in the plug-in program according to the present invention enables the printer drive to be run via the OS. Numeral 3202 denotes plug-in control data referred when the plug-in program 3201 is executed. The module 3203 contains print data management information for managing print target data 3204 received from the WWW server and stored in the storage area.

Programs and data stored in a floppy disk can be stored, for example, in the client unit 101, shown in FIG. 1, by transferring them to the hard disk 214 using the hard disk driver 209.

Numerals 3205 to 3207 denote divided sets of the print target data downloaded from the WWW server. The restored print target data is stored in modules subsequent to 3204 as print target data (1 to N).

Figure 3:
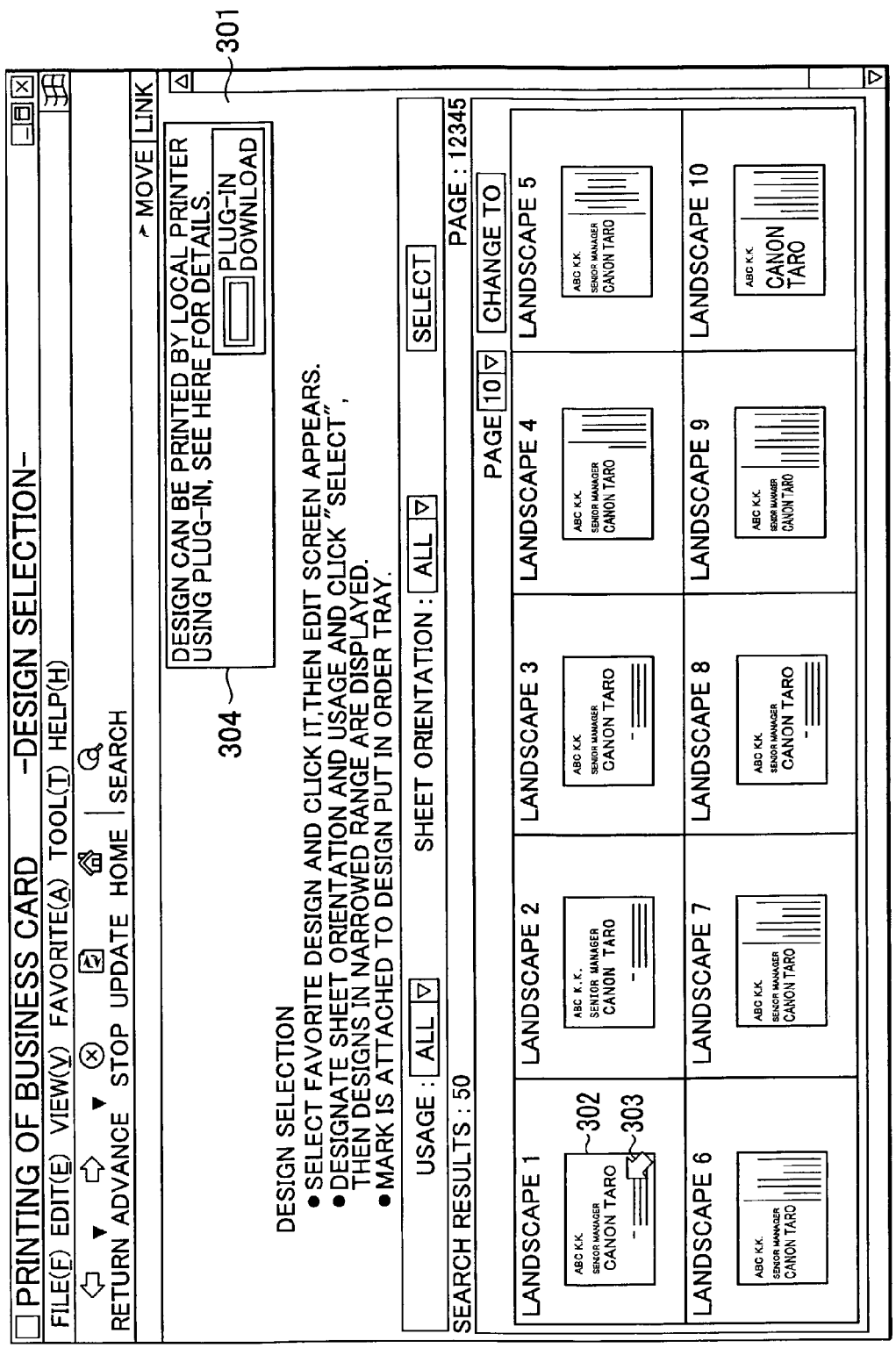
FIG. 3 is an explanatory view of a browser display screen for selecting a document to be printed.
Figure 4:
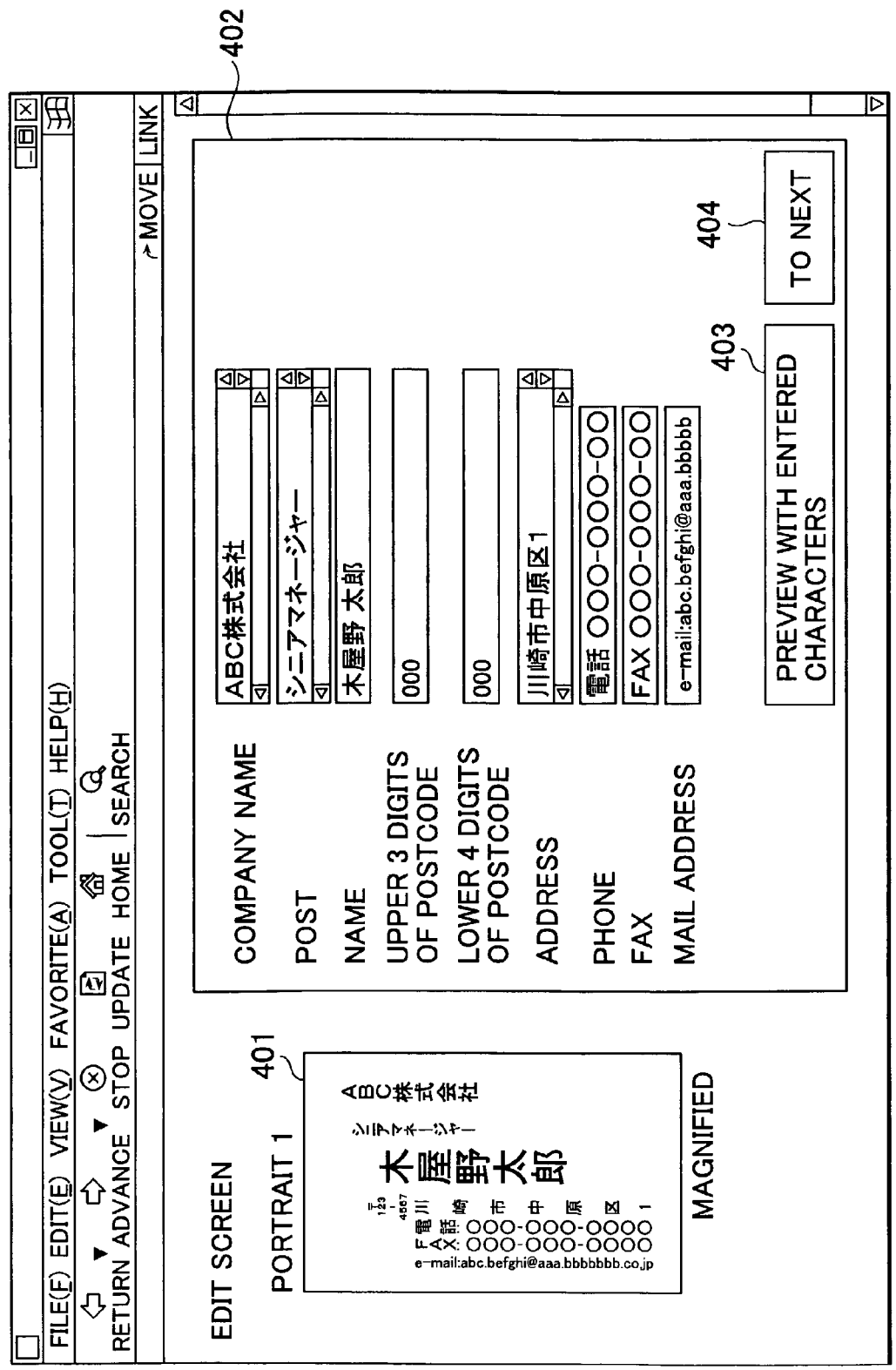
FIG. 4 is an explanatory view of a browser display screen for setting print details of the selected document.
Figure 5:
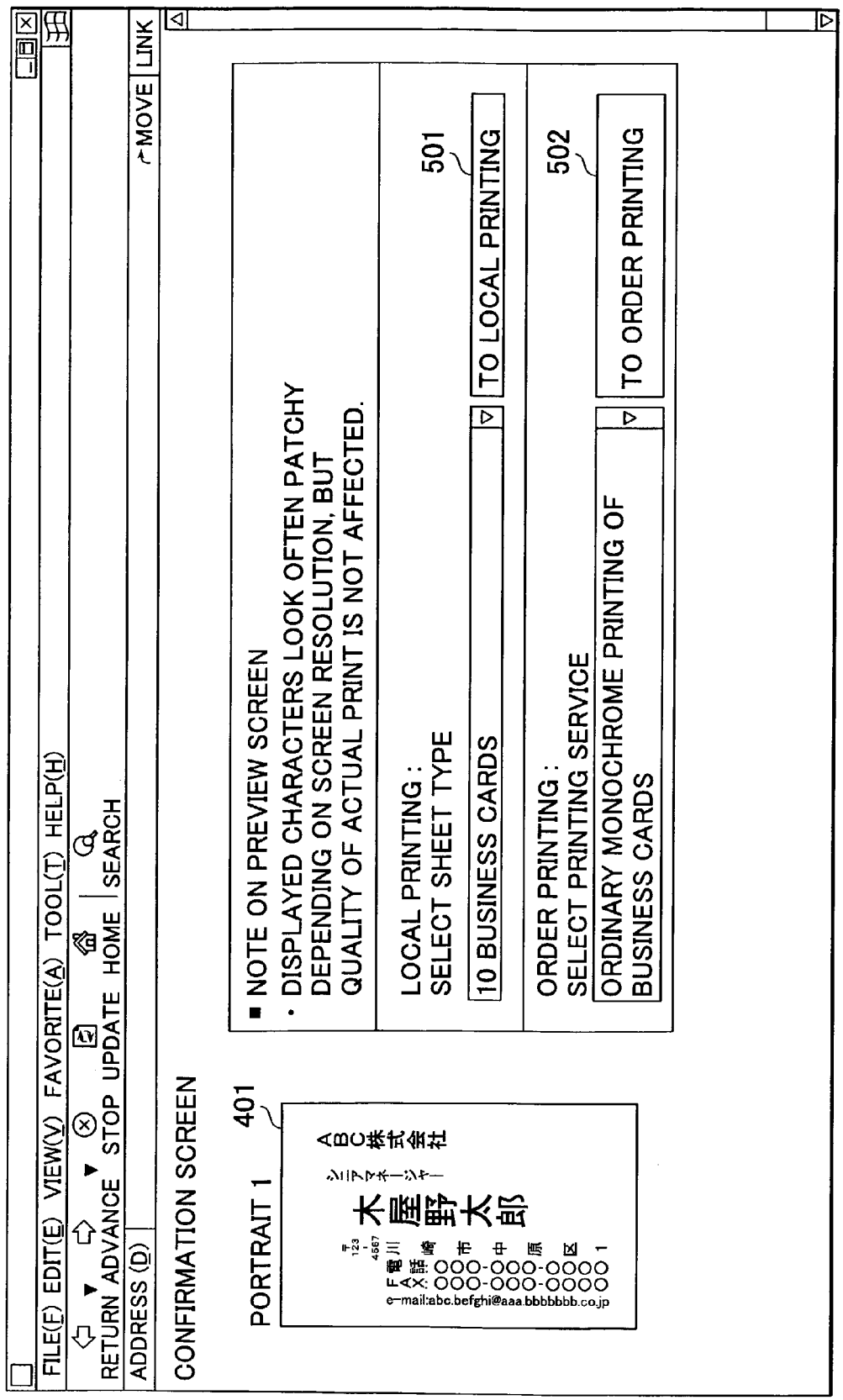
FIG. 5 is an explanatory view of a browser display screen for, with regard to the document to be printed, instructing whether order printing or local printing is performed, and designating a print layout.

FIGS. 3, 4 and 5 are explanatory views for explaining the operation of the document printing apparatus according to this embodiment. Numeral 301 denotes a browser display screen for selecting a document to be printed, i.e., one screen display by the WWW browser. Here, the term "browser display screen" means a screen displayed by the browser based on a page described in the HTML format readable by the web browser. However, the description format is not limited to HTML, and any kind of structured document, such as XML, can be used. Such a structured document is prepared by the web server and transferred to the browser in the client unit 101. Then the browser display screen displays a list of the document data stored in the server unit. Numeral 302 denotes document data previewed in respective layouts. A user can select any kind of document data listed on the browser display screen 301 by using a pointer 303 of a pointing device.

Numeral 304 is a button for instructing the download of the plug-in 103 according to the present invention to the browser. When the user depresses the plug-in download button 304 using the pointing device 303, a plug-in download instruction is transmitted to the web server 108. In response to the download instruction, the plug-in 103 is downloaded from the web server 108 to the client unit 101 and registered as a DLL file in a system of the client unit 101. At the time of executing the browser display screen (structured document), the browser 102 can run the plug-in, which has been registered in the system, when a command for executing the plug-in is described in the structured document to be displayed by the browser. The registration of the plug-in in the system is well known and hence is not described here.

Also, when the user selects the desired document data using the pointing device 303, the browser display screen is changed to that shown in FIG. 4. Numeral 401 denotes a preview image of the document data selected by the user, which is displayed by the WWW browser in a magnified scale. Numeral 402 denotes a menu for editing details of the document data. The document data selected in FIG. 3 determines the layout of the respective data, and details to be printed can be edited using the menu 402 in FIG. 4. The data after being edited can also be displayed for preview. Thus, by clicking a preview button 403, a preview request and the date after being edited are transmitted from the web browser 102 to the web server 108. Practically, the edited data is added as an argument of URL and sent to the web server. By clicking a "To Next" button 404, the browser display screen is changed to that shown in FIG. 5.

FIG. 5 is an explanatory view of a browser display screen for, with regard to the document to be printed, instructing whether order printing or local printing is performed, and designating a print layout. On this screen, the user can online-order, as order printing, the print details edited with the browser 102 of the client unit 101 via the Internet, and also can download the print details for local printing.

Numeral 501 denotes a button for downloading the edited print details and printing them by a local printer. The user can instruct what kind of printing is to be performed, using a pull-down menu positioned on the left of the button 501. Practically, the print layout type can be selected from among "10 business cards", "8 business cards", "business cards for card printer A", "business cards for card printer B", and "no designation".

Numeral 502 denotes a button for ordering printing of the edited print details to an online printing service via the Internet. The online printing service will be described later.

Figure 16:
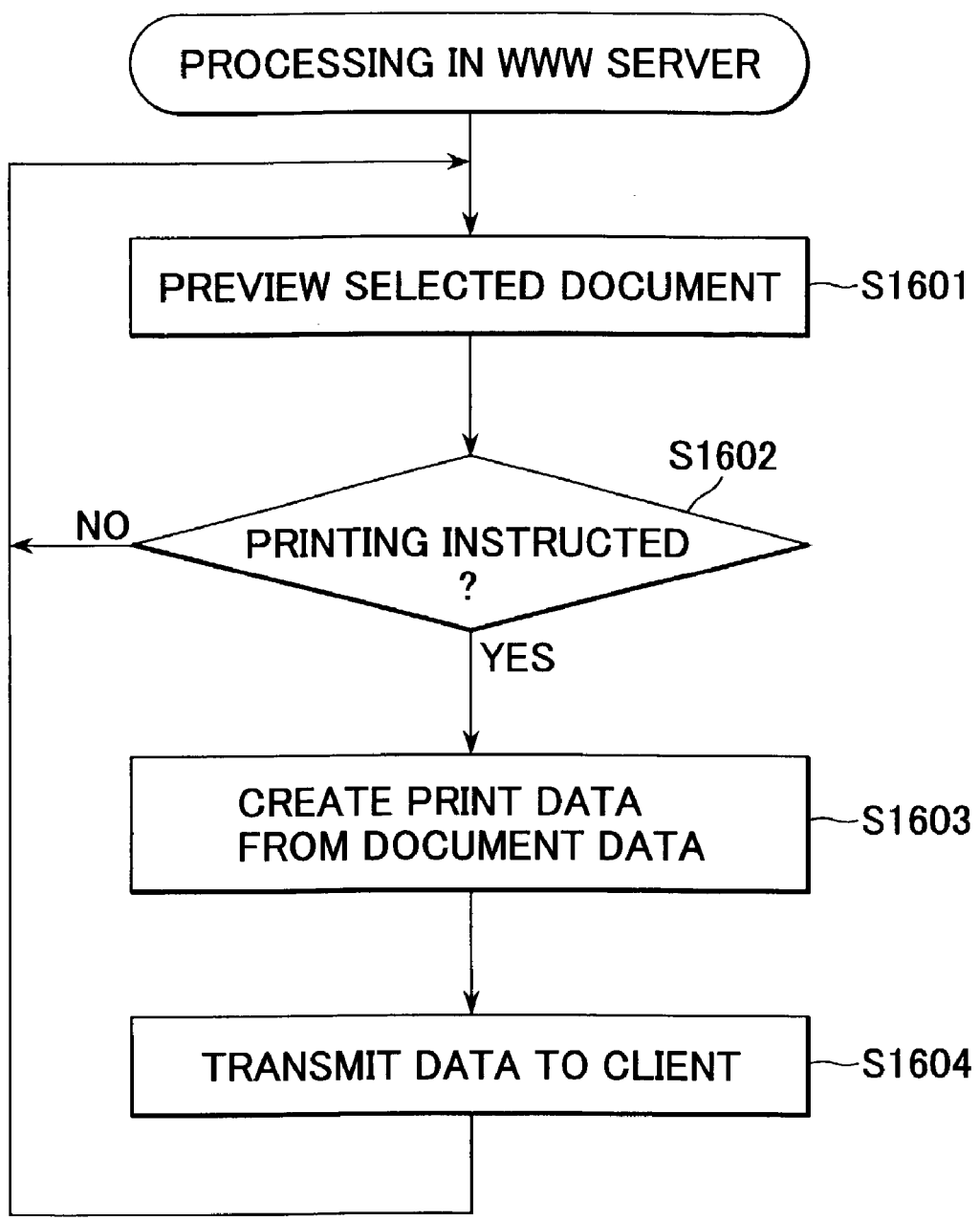
FIG. 16 is a flowchart for explaining a document selecting and printing setting process in a web server of the server unit.

Processing procedures according to the present invention will be described below with reference to flowcharts. FIG. 16 is a flowchart showing processing in the WWW server 108.

Figure 17:
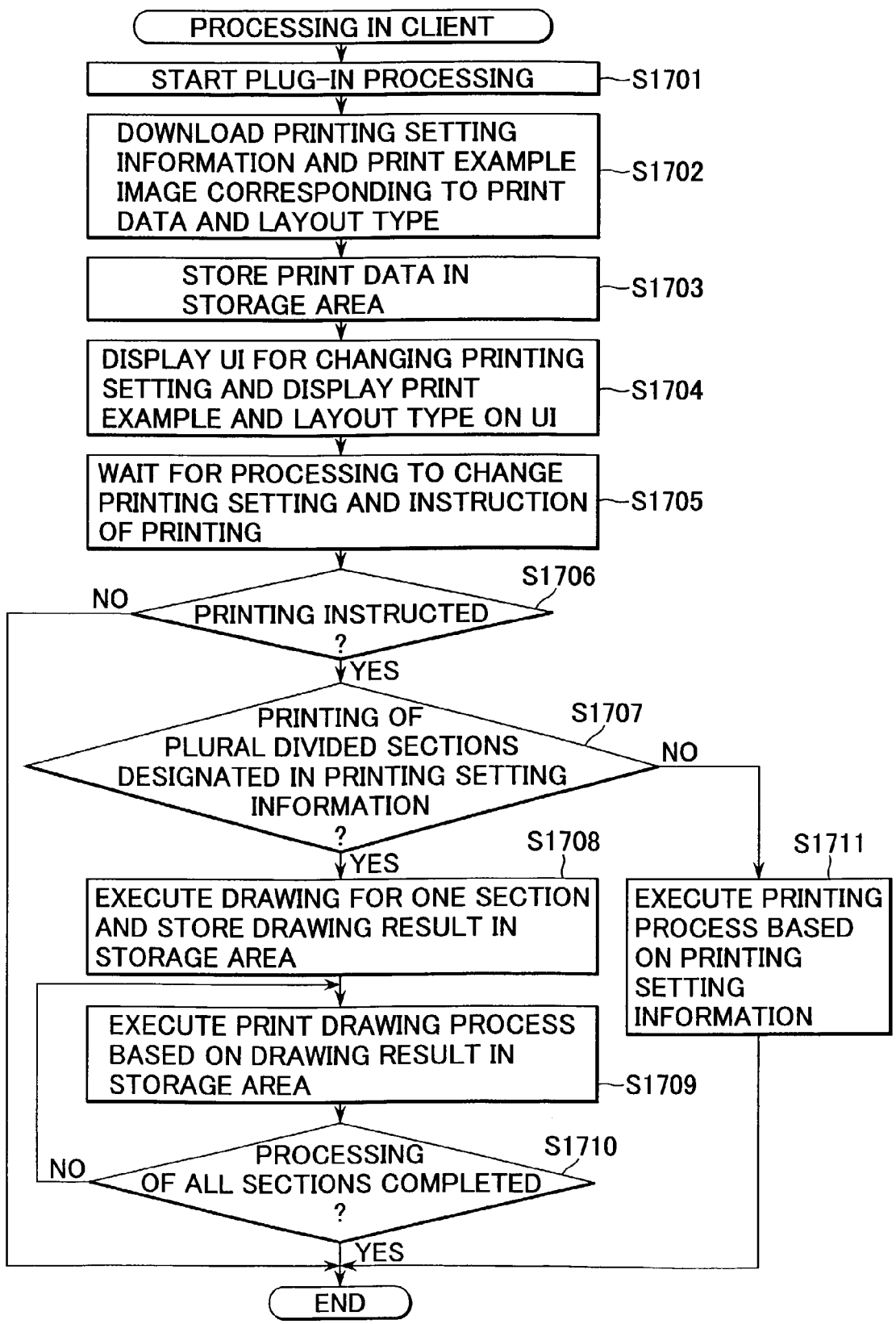
FIG. 17 is a flowchart for explaining a process of downloading the print target data in the client unit.

FIG. 17 is a flowchart showing a part of the processing executed in the client unit 101 with the plug-in 103. Application program 2001 is transferred to the load area of the RAM 208 via the floppy disk drive 210, for example, and provided to the CPU 206.

Referring to FIG. 16, in step S1601, the web server 108 creates a structured document of the browser display screen shown in FIG. 3 and sends it to the browser 102 of the client unit 101. Also, in response to the pointer operation by the user, the structured documents shown in FIGS. 4 and 5 are created and transferred as appropriate. In step S1602, the web server 108 determines whether the user of the client unit 101 clicked button 501 in FIG. 5. This determination is made based on whether the web server 108 receives an instruction of local printing from the browser 102 when the user clicks the button 501 in FIG. 5. When the local printing is instructed, the process flow advances to step S1603 in which the web server 108 creates print target data by reading the selected type of the document data from the document data 109 and obtaining from the browser 102, as arguments of URL, the edited details (data edited based on the menu shown in FIG. 4) and designation of the print layout type (designation of one item in the pull-down menu on the left of the button 501). The print target data created here may be described in any desired format, but must be capable of being interpreted by the plug-in program 103 explained later. In this embodiment, the print target data is described in the script form called OpenPage. In next step S1604, the web server 108 transmits download information containing the created print target data to the browser 102.

Figure 14:
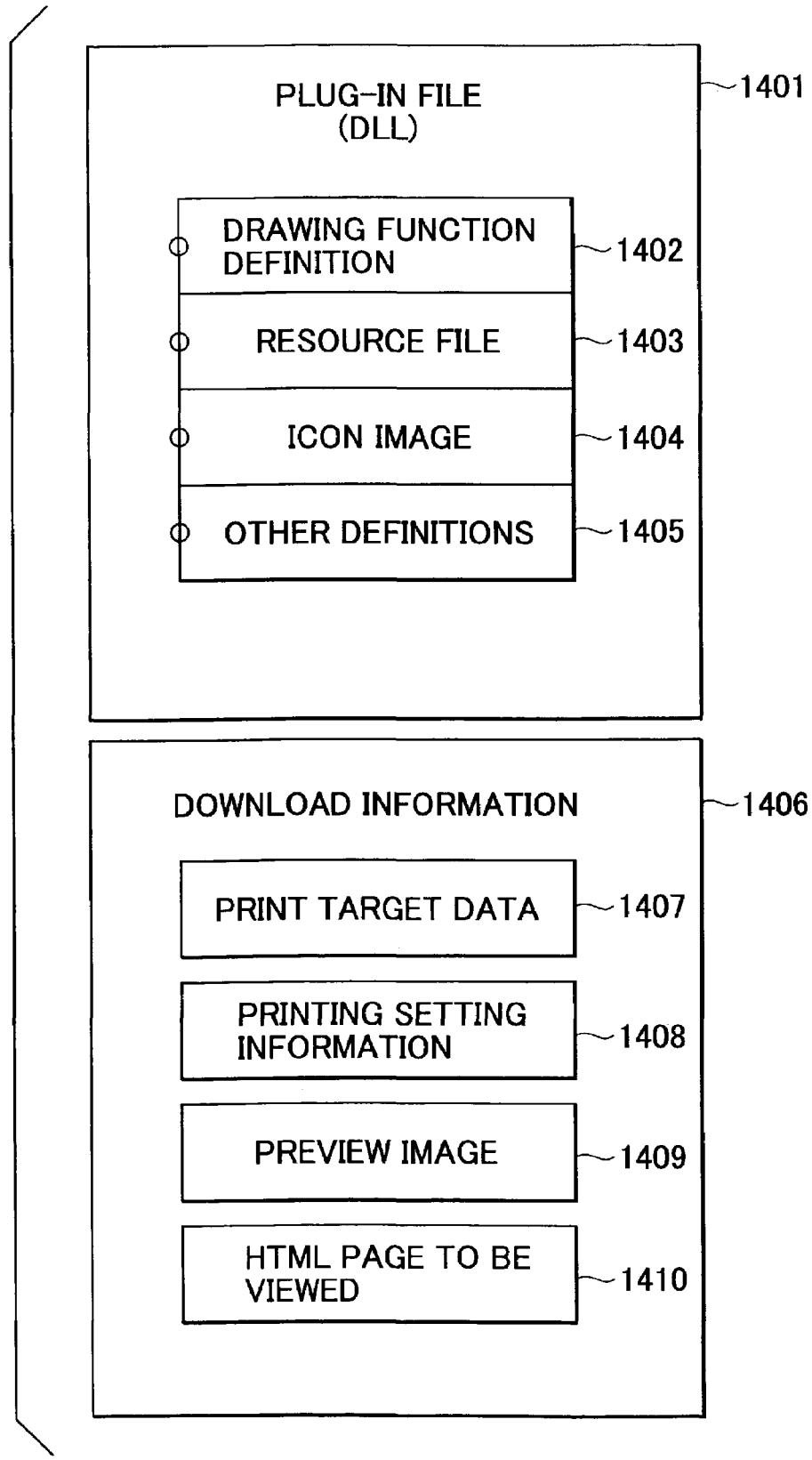
FIG. 14 shows the contents of a plug-in file, according to the present invention, downloaded to a client unit, and details of download information downloaded from a server unit to the client unit when printing is instructed.

The plug-in 103 and the download information both downloaded from the web server 108 to the client unit 101 are explained here. FIG. 14 is a conceptual view for explaining the plug-in file and the download information both downloaded from the web server 108.

Numeral 1401 denotes a plug-in file corresponding to a DLL file in the Windows (trade name of Microsoft (USA)) system that is employed in this embodiment. In this plug-in file, a drawing function definition 1402, a resource file 1403, an icon image 1404, and other definitions 1405 are compiled. The drawing function definition 1402 is a definition for converting the print target data into drawing functions (called GDI functions), which are defined in the system, for enabling the plug-in 103 to output the print target data, as drawing functions, to a graphic engine given by a drawing section of the OS when the downloaded print target data is printed. The resource file 1403 describes a command issued from the plug-in 103, as required, to instruct the OS to display a later-described dialog display screen on the CRT 201. The icon image 1404 is an image for displaying an icon indicative of a shortcut, explained later, on the CRT 210. Other definitions are described in 1405.

Numeral 1406 denotes download information that is downloaded from the web server 108 to the client unit 101 when the local printing button 501 shown in FIG. 5 is clicked. The download information 1406 contains print target data 1407, printing setting information 1408, a preview image 1409, and an HTML page 1410 to be viewed, which are stored as independent files in a predetermined folder in the client unit 101. In this embodiment, a new folder is created in "My Documents" of the Windows system and those files are downloaded in the new folder. The print target data 1407 is, as mentioned above, described in the OpenPage language (script form), and comprises a part of the selected document data, as explained later. The printing setting information 1408 contains, as explained below in connection with FIG. 15, various printing settings and the print layout type. When carrying out the printing process for the print target data, the plug-in 103 obtains the print layout type in the printing setting information, creates drawing data for a document of the print target data through N-up arrangement, etc., based on the designated print layout type, and outputs the drawing data to a graphic engine as an OS drawing means (generally called GDI in the Windows system). The preview image 1409 corresponds to a preview image displayed on a browser display screen shown in FIG. 8. The HTML page 1410 to be viewed is a structured document in the HTML format, for example, and corresponds to the browser display screen shown in FIG. 8.

Numeral 1501 in FIG. 15 denotes details of the printing setting information 1408 downloaded by the plug-in 103 together with the print target data when the local printing is instructed by clicking the button 501 in FIG. 5. A layout type name 1502 describes the name corresponding to the print layout type designated on the pull-down menu (also called "combo box") on the left side of the button 501 in FIG. 5. Numeral 1503 denotes a horizontal (short) width of a sheet size (in units of 1/100 mm), and 1504 denotes a vertical (long) width of the sheet size. Numeral 1505 denotes a horizontal (short) width of a divided section size, and 1506 denotes a vertical (long) width of the divided section size. Numeral 1507 denotes the number of divided sections in the horizontal (short) direction, and 1508 denotes the number of divided sections in the vertical (long) direction. Numeral 1509 denotes a horizontal offset, and 1510 denotes a vertical offset. Numeral 1511 denotes a horizontal gap, and 1512 denotes a vertical gap. Numeral 1513 denotes a name of print example image data. This information, 1503 to 1512, is used to define the layout so that the layout can be more finely designated.

<Processing Flow in Client>

A processing flow in the client unit 101 will now be described below. First, the client unit 101 must download the plug-in 103 according to the present invention from the server unit 107.

To that end, when the user clicks the plug-in download button 304 on the browser display screen of FIG. 3 displayed by the browser 102, a plug-in download instruction is sent from the browser 102 to the web server 108. In response to the plug-in download instruction, the plug-in 103 is downloaded from the web server 108 to the browser 102 and then is automatically installed in the browser 102. When a plurality of browsers 102 (e.g., Internet Explorer and Netscape Navigator) are present in the client unit 101, the plug-in 103 is installed in the system as a plug-in shared by the plurality of browsers 102. Practically, the plug-in 103 is a DLL file and becomes usable from the browser 102 by being stored in a predetermined folder in the system.

After the plug-in 103 has been installed in the system and the browser 102 has become usable, download information can be downloaded by the user clicking the local printing button 501. In response to the clicking of the local printing button 501, the print target data being of the document type selected on the screen of FIG. 3 and having edited details set on the screen of FIG. 4, and the printing setting information containing the print layout type selected on the screen of FIG. 5 are both downloaded as download information from the web server 108 to the browser 102. The download information comprises data as mentioned above with reference to FIG. 14.

Figure 6:
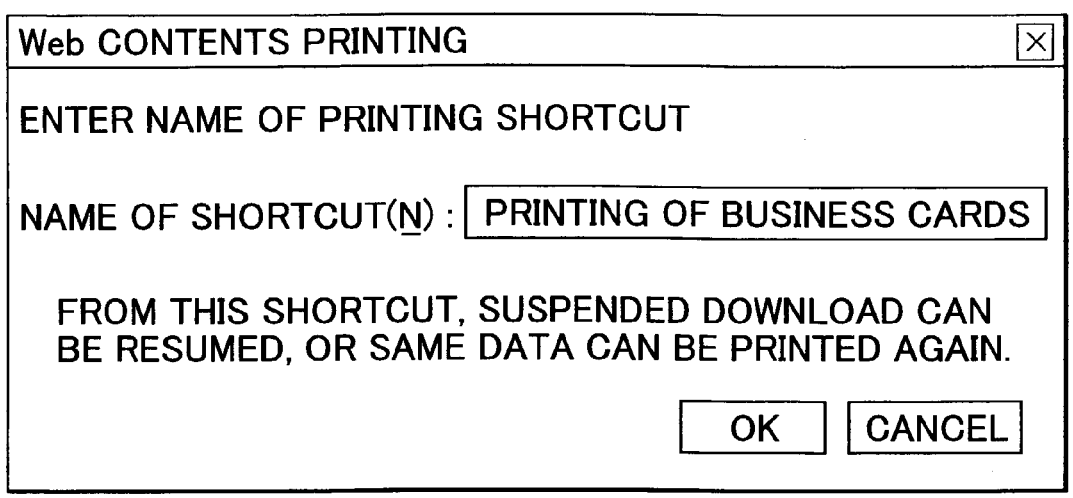
FIG. 6 shows one example of a dialog screen for designating creation of a shortcut linked with a browser display screen for designating printing or reacquisition of downloaded contents.

When the download information is downloaded from the web server 108 to the browser 102, the plug-in 103 is run and a dialog screen shown in FIG. 6 is displayed. The dialog screen of FIG. 6 is a screen for prompting the user to decide a name for a printing shortcut. A shortcut icon (FIG. 7) having the name set on the dialog screen is created at a predetermined location. While the shortcut icon is created on the desktop of the client unit 101 in this embodiment, the present invention is not limited to this and the shortcut icon may be created in a "My Documents" folder.

Figure 8:
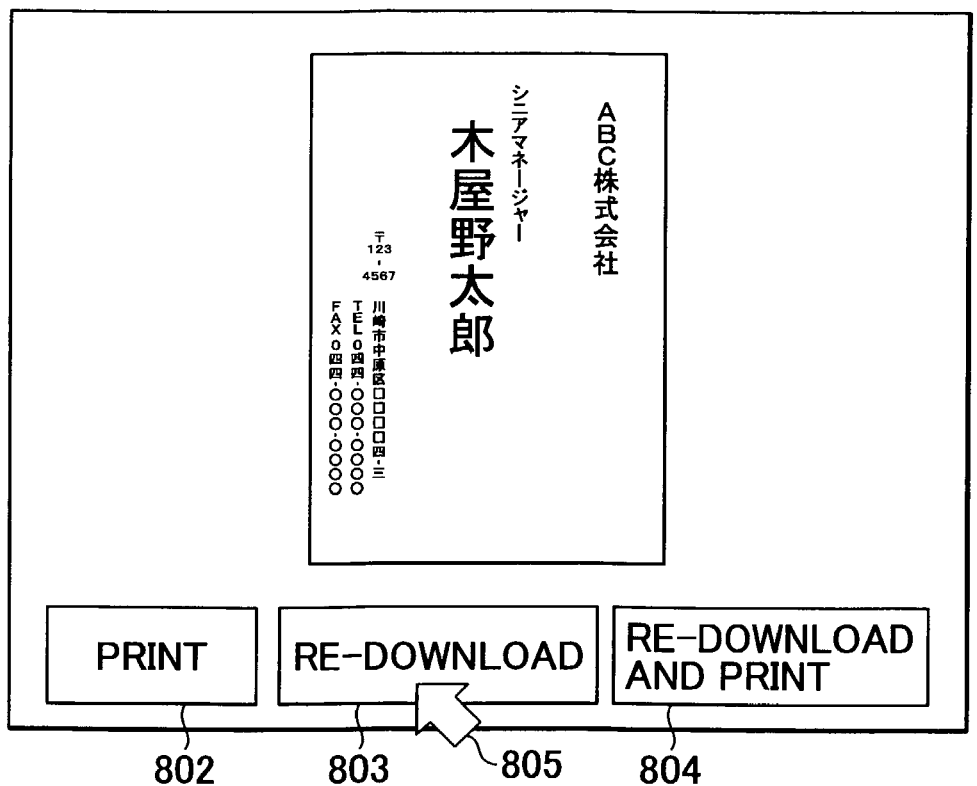
FIG. 8 shows one example of a browser display screen capable of designating printing or reacquisition with regard to downloaded print target data.

After the shortcut icon has been created and the download information has been downloaded, the browser 102 displays a browser display screen shown in FIG. 8. In a display area 801 of the browser display screen, a preview of the document contents set on the screens of FIGS. 3 to 5 is displayed. A print button 802, a re-download button 803, and a re-download and print button 804 are also displayed. Each of those buttons can be clicked with the pointer 805 of the pointing device.

Figure 9:
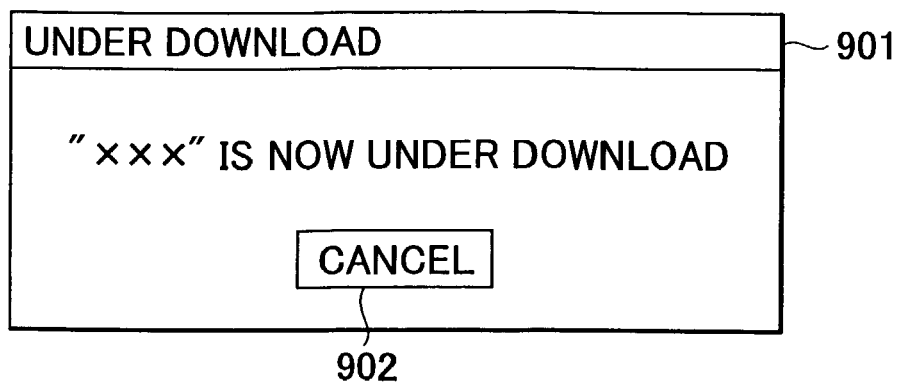
FIG. 9 shows one example of a dialog screen displayed when downloading the print target data.

When the re-download button 803 or the re-download and print button 804 is clicked with the pointer 805, the download information (FIG. 14) is downloaded again from the web server 108 to the client unit 101 via the browser 102. During the download, a dialog screen shown in FIG. 9 is displayed. The dialog screen of FIG. 9 has a cancel button 902. When the cancel button 902 is selected, the download is suspended.

When the printing process is started by clicking the print button 802 or the re-download and print button 804, a dialog screen shown in FIG. 10 is displayed in response to an instruction from the plug-in 103. The dialog screen of FIG. 10 has a pull-down menu 1001 (also called a "combo box") for selecting an output printer, a print button 1002, a setting change button 1003, and a cancel button 1004. The pull-down menu 1001 displays a printer, adapted for the printer driver 104, installed in the system of the client unit 101. The display of the printer can be realized by putting the following description in the resource file 1403 of the plug-in 103:

LTEXT "Printer Name (&N):", IDC_STATIC, 9, 57, 54, 8, SS_CENTERIMAGECOMBOBOXIDC_COMBO_PRINTER, 76, 74, 163, 99, CBS_DROPDOWNLIST|CBS_SORT|WS_VSCROLL|WS_TABSTOP "LTEXT" in line 1 designates display of a text "printer name (N):" in FIG. 10 and a place at which the text is displayed. "COMBOBOX" in line 2 designates a list of printer drivers 104, which are currently installed in the system, to be displayed in respective designated positions.

Figure 12:
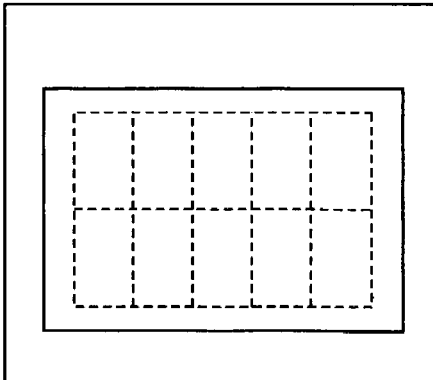
FIG. 12 shows one example of a dialog screen displayed when setting change is selected in the printing instruction dialog screen, for changing printing setting of the printer driver.

Upon clicking the setting change button 1003, a dialog screen shown in FIG. 11 or 12 is displayed. First, the plug-in 103 inquires about various printing settings of the printer driver 104 by using an extended API (Application Program Interface) that is an extended one of an OS-defined API. The term "API" used herein means an interface via which an application inquires a printer driver. Basic inquiries are supported by the OS via the API. Although basic information, such as a sheet size, orientation and the number of prints, can be inquired using the API, recent printer drivers are adapted for more detailed settings, such as a sheet type (media type) and special printing (e.g., fit printing and frameless printing), and those settings that cannot be obtained via an OS-defined API. Therefore, some types of printer drivers 104 support an extended API, such that an application (the plug-in 103 in this embodiment) can make more detailed inquiries. To be adapted for such a case, the plug-in 103 inquires whether the printer driver selected on the pull-down menu 1001 supports an extended API. If the selected printer driver supports an extended API, a dialog screen shown in FIG. 12 is created and displayed. If the selected printer driver does not support an extended API, a property dialog screen for a printer driver, shown in FIG. 11, is instructed to be displayed.

FIG. 11 shows a property screen for an ordinary printer driver, allowing the user to perform various printing settings. On the other hand, a dialog screen 1201 of FIG. 12 is created in accordance with the description of the resource file 1403 in the plug-in 103. In the dialog screen 1201, as with the resource file explained above, a text and a pull-down menu (combo box) are created and displayed. More specifically, numeral 1204 denotes a menu similar to that in the printer selection screen explained above with reference to FIG. 10. A box 1205 displays, as an initial state, one media type obtained from the printer driver 104 using the extended API, and its pull-down menu (combo box) displays other media types obtained using the extended API. Thus, a dialog screen, allowing the user to set just necessary items without opening the property screen of the printer driver, is created and displayed. The user can, accordingly, make the setting more conveniently. Though not shown in FIG. 12, a button for "setting the property screen" may be provided such that the property screen of the printer driver is displayed upon clicking that button.

Figure 13:
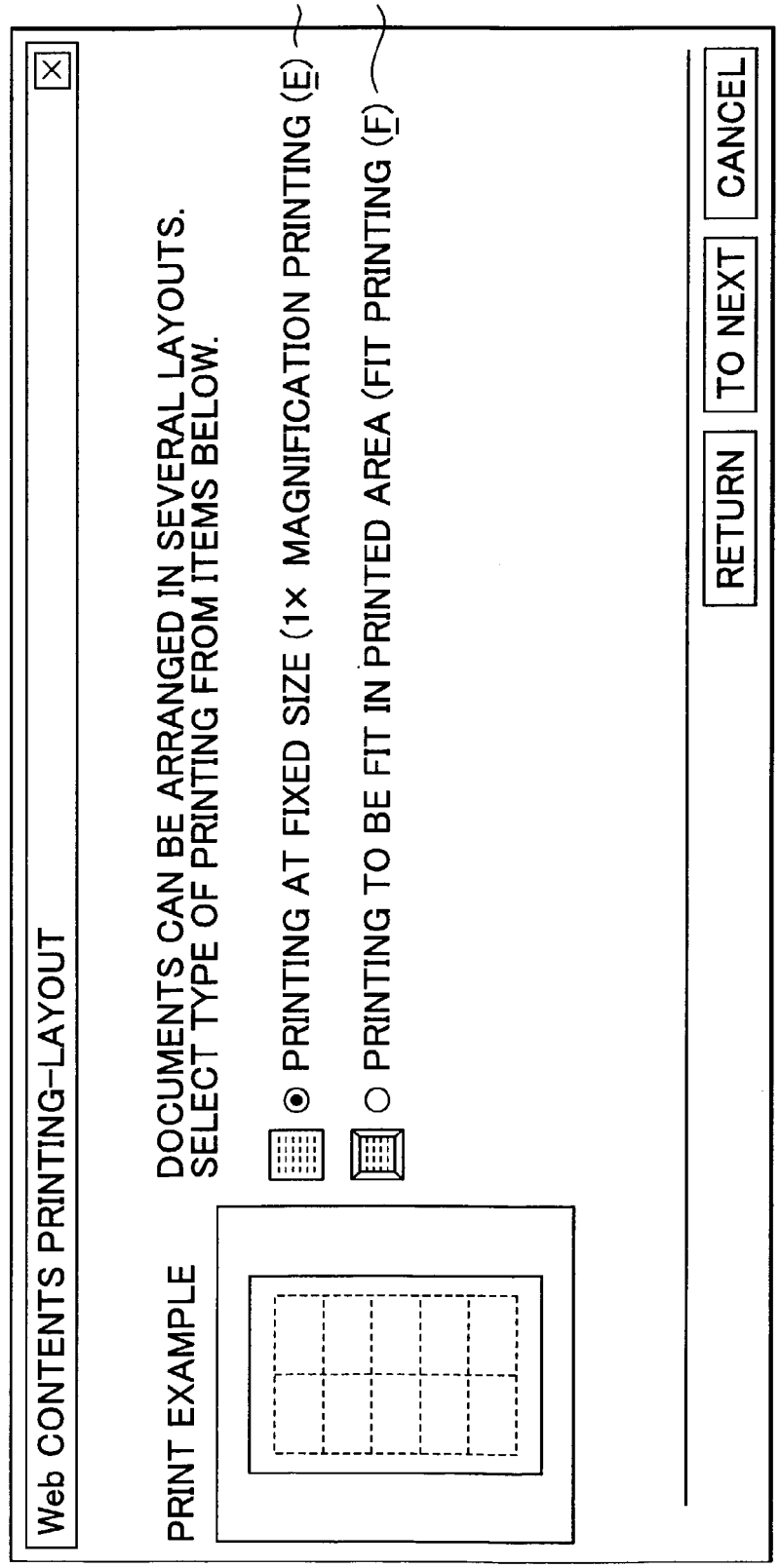
FIG. 13 shows one example of a dialog screen displayed when setting change is selected in the printing instruction dialog, for instructing a printing method.

When the printing setting is performed on either the screen of FIG. 11 or 12 and an OK button or a print button is clicked, a dialog screen shown in FIG. 13 is displayed. The dialog screen of FIG. 13 has a 1×-magnification button 1301 for executing printing in a fixed size, and a fit printing button 1302 for executing printing to be fitted in a printed area. The 1×-magnification button 1301 can be selected for all types of printers, and the fit printing button 1302 can be selected for only a printer in which the fit printing is supported using the extended API. Details of the fit printing will be described later. When a "To Next" button is clicked on the dialog screen of FIG. 13, the display screen is returned to the dialog screen of FIG. 10.

Upon clicking the print button 1002 on the dialog screen of FIG. 10, the printing process is started. The plug-in 103 first reads the print target data 1407 and the printing setting information 1408 which have been downloaded, and then edits the print target data in accordance with the settings in the printing setting information 1408. Practically, when "10 business cards" is designated as the layout type name 1502, the read print target data of business card size is arranged in each of ten divided sections of A4-size. Drawing functions (GDI functions) are created based on the drawing function definition 1402 in the plug-in file 1401 and are output to the graphic engine (GDI) as an OS drawing means with an output destination set to the printer driver 104. The OS graphic engine converts the GDI functions, i.e., the drawing functions obtained from the plug-in 103, into DDI (Device Driver Interface) functions, i.e., drawing functions interpretable by the output printer driver, and then outputs the converted DDI functions to the printer driver 104. The printer driver 104 converts the DDI functions received from the OS graphic engine into print data described in the printer control language interpretable by the printer 105, and creates a printing job including the print data. The created printing job is output to an OS print spooler which sends the printing job to the printer 105. The printer 105 prints the print data in the received printing job with known techniques. Here, the term "print data" is assumed to be data that is described in the printer control language and created by the printer driver 104. The term "print target data" is assumed to be data that is prepared in the web server in data form (e.g., script form of OpenPage) not depending on the printer type and is downloaded to the browser 102. The term "printing job" means data obtained by demarcating the print data created by the printer driver using JL (Job Language), such as the start of job and the end of job. It is not especially necessary to discriminate the printing job and the print data from each other.

<Control Flowchart in Client>

Processing procedures in the present invention will be described below with reference to flowcharts. FIG. 17 is a flowchart showing a part of the processing executed in the client unit 101 with the plug-in 103.

In step S1701 of FIG. 17, the plug-in 103 is run upon clicking the local printing button 501 on the screen of the browser 102 shown in FIG. 5. In next step, S1702, the plug-in 103 downloads, from the web server 108, the download information (1406 in FIG. 14) containing the print target data, the printing setting information corresponding to the designated layout type, and the print example image.

In step S1703, the plug-in 103 stores the download information 1406, including the downloaded print target data, the printing setting information, and the print example image, in a predetermined storage area in the client unit 101 (i.e., in the new folder created in "My Documents"). Then, in step S1704, the plug-in 103 displays the dialog screen (UI for changing the printing setting) shown in FIG. 10, and also displays the print example and the layout type name. Thereafter, the plug-in 103 waits for the inputting of a printing instruction in step S1705. When the user clicks the print button 1002 on the screen of FIG. 10 to instruct the start of printing, the plug-in 103 determines in step S1706 that printing is instructed, and then proceeds to step S1707.

In step S1707, the plug-in 103 reads the printing setting information 1408 and determines whether plural-section printing is designated in the print layout type 1502 of the printing setting information. If the plural-section printing is not designated, the plug-in 103 executes, in step S1711, the drawing process for one section, i.e., creates the GDI functions, based on the printing setting information, and outputs the created GDI functions to the OS graphic engine, following which the process flow is brought to an end. If the plural-section printing is designated, the plug-in 103 executes, in step S1708, the drawing process of the print target data for one section based on the drawing function definition 1402, and stores the drawing result in the storage area. Then, in step S1709, the plugin 103 executes the drawing process for another section using the drawing result for one section stored in the storage area. In step S1710, the plug-in 103 checks whether the drawing process for all the sections has been completed. If not, the plug-in 103 returns to step S1709 to execute the drawing process for the next section. If the drawing process for all the sections has been completed, the plug-in 103 creates the GDI functions for all the sections and outputs the created GDI functions to the OS graphic engine. The printing process in the plug-in 103 is then brought to an end.

Thus, because the drawing functions (GDI functions) corresponding to the print layout type are output from the plug-in 103 to the OS graphic engine, the printer driver 104 can create the printing job for the print layout type, which is desired by the user, by converting the drawing functions (DDI functions) received from the OS graphic engine into data in printer control language. Also, because the print target data for just one section is downloaded, the amount of print target data downloaded is small and the communication cost is reduced even when the print layout type designated for the download contains many sections.

<Explanation of Fit Printing>

In this embodiment, as mentioned above with reference to FIG. 13, the fit printing can be designated by clicking the fit printing button 1302.

FIG. 18 shows an extended example 1801 of the printing setting information 1501 shown in FIG. 15. Items 1502 to 1513 are the same as those in the printing setting information 1501, and hence are not explained here. Numeral 1802 denotes a fit type. The fit type can be controlled from the WWW server side by describing, in item 1802, whether maximum fit or minimum fit is performed in the fit processing. Numeral 1803 denotes an extension amount. The extension amount can be controlled from the WWW server side by describing, in item 1803, the extension amount in the drawing executed in the fit processing.

Figure 19A:
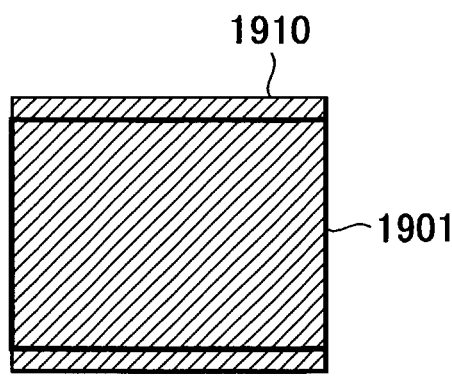
FIG. 19A-19D are conceptual views for explaining fit processing according to the present invention.
Figure 19B:
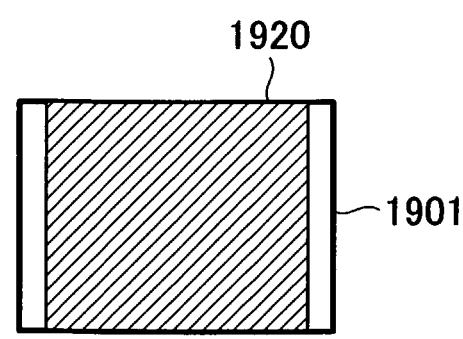
Figure 19C:
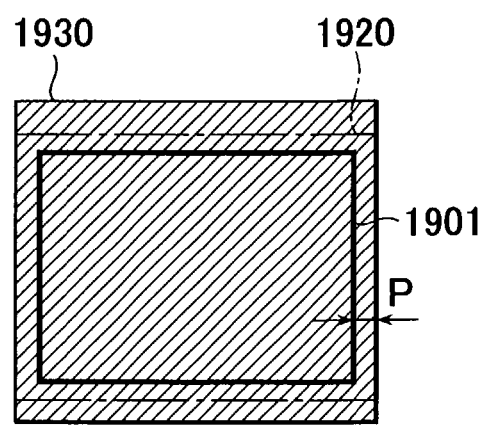
Figure 19D:
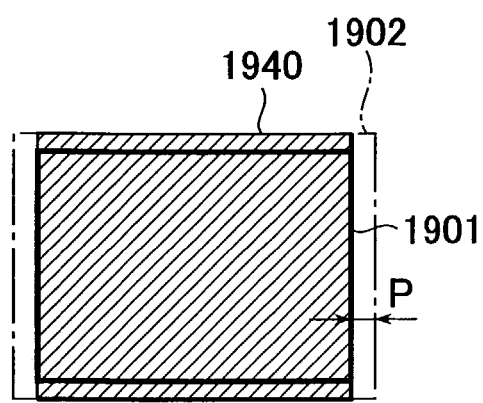

FIGS. 19A to 19D are explanatory views for explaining the fit processing. In FIGS. 19A-19D, numeral 1901 denotes an area of each section of an output sheet or layout, and 1910-1940 denote an area of the print data. FIG. 19A shows the case in which the print data extends from the output sheet and is fitted to a maximum size. This is referred to as "maximum fit". Conversely, in FIG. 19B, the print data is perfectly located within the output sheet. This is referred to as "minimum fit". Further, in FIGS. 19C and 19D, an extension amount P is taken into consideration in each of FIGS. 19A and 19B. In other words, FIGS. 19C and 19D show respectively states of maximum fit (FIG. 19C) and minimum fit (FIG. 19D) to a rectangular shape 1902 which is the result from enlarging the output sheet area 1901 by the extension amount P.

Figure 20A:
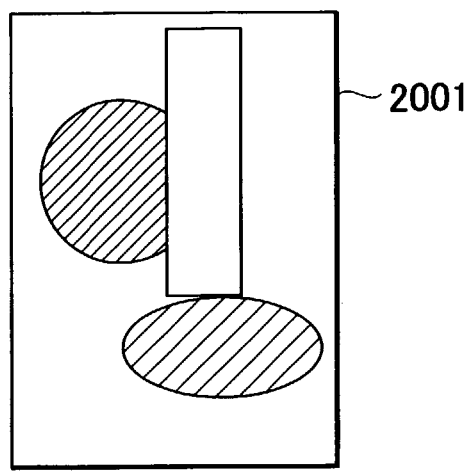
FIG. 20A to 20D are conceptual views for explaining fit printing according to the present invention.
Figure 20B:
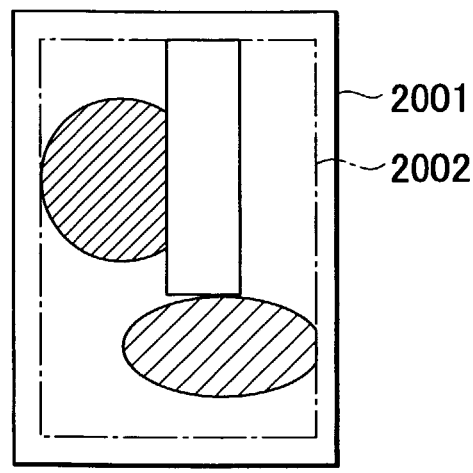
Figure 20C:
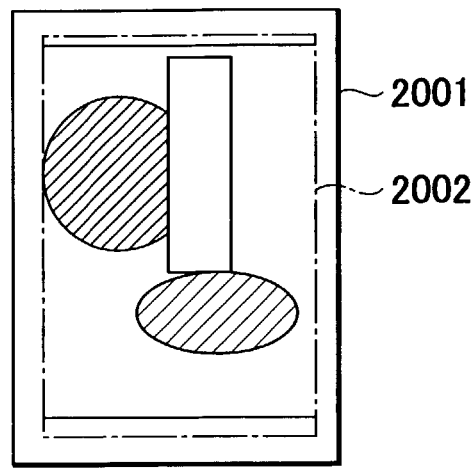
Figure 20D:
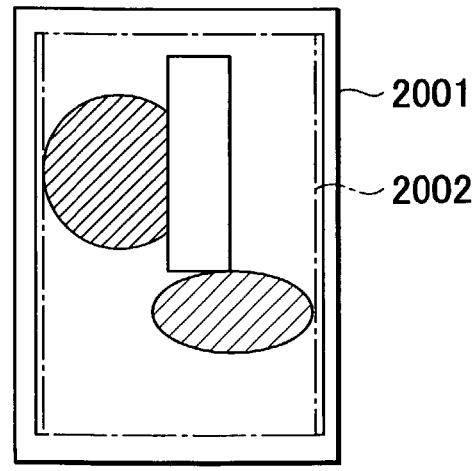

FIGS. 20A to 20D are explanatory views for explaining an actual fit printing process. FIG. 20A shows print data 2001. In the case of ordinary 1×-magnification printing, the print data located outside a printed area 2002 of the printer is not printed as shown in FIG. 20B. FIG. 20C shows the case of minimum fit to the printed area 2002 of the printer, in which all of the original print data is contained in the printed area 2002. FIG. 20D shows the case of maximum fit to the printed area 2002 of the printer, in which the original print partly extends out of the printed area 2002 (leftward and rightward), but there is no blank space on the printed area 2002.

<Explanation of Frameless Printing>

Figure 21A:
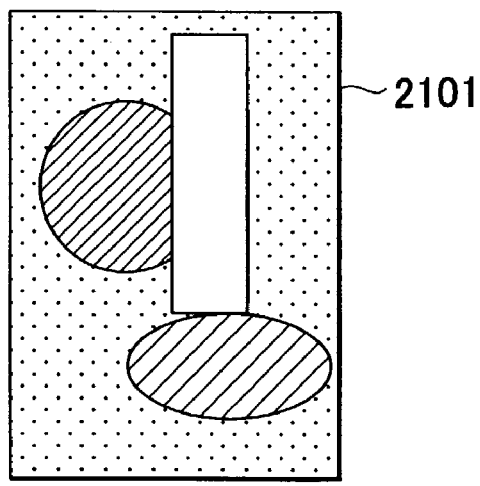
FIG. 21A to 21C are conceptual views for explaining frameless printing according to the present invention.
Figure 21B:
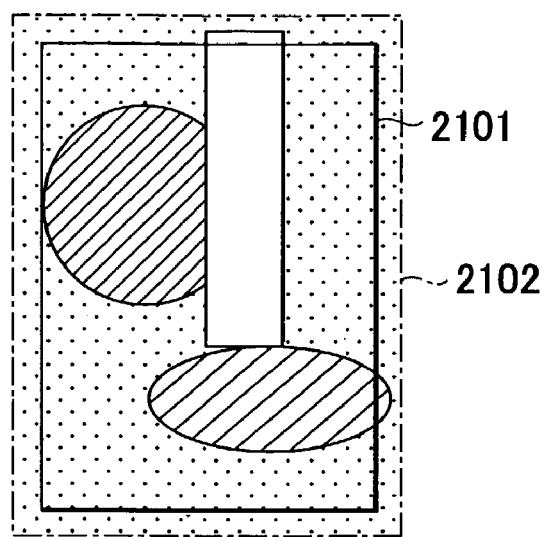
Figure 21C:
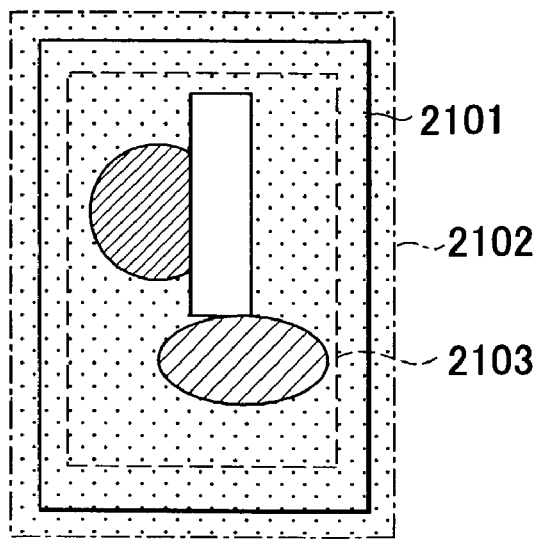

FIGS. 21A to 21C are explanatory views for explaining a frameless printing process. FIG. 21A shows print data 2101. In the case of ordinary frameless printing, print data is drawn such that it is enlarged to extend beyond the sheet, as indicated by 2102 in FIG. 21B, and a part of the print data is not printed. FIG. 21C shows the case of frameless printing with fit processing, in which background data of the print data 2101 is enlarged to extend beyond the sheet, while data, other than the background, is drawn so as to be located within a virtual printing enable area 2103 for the frameless printing. Thus, important data other than the background can be printed on the sheet.

<Control Flowchart in Client for Fit Printing and Frameless Printing>

Figure 22:
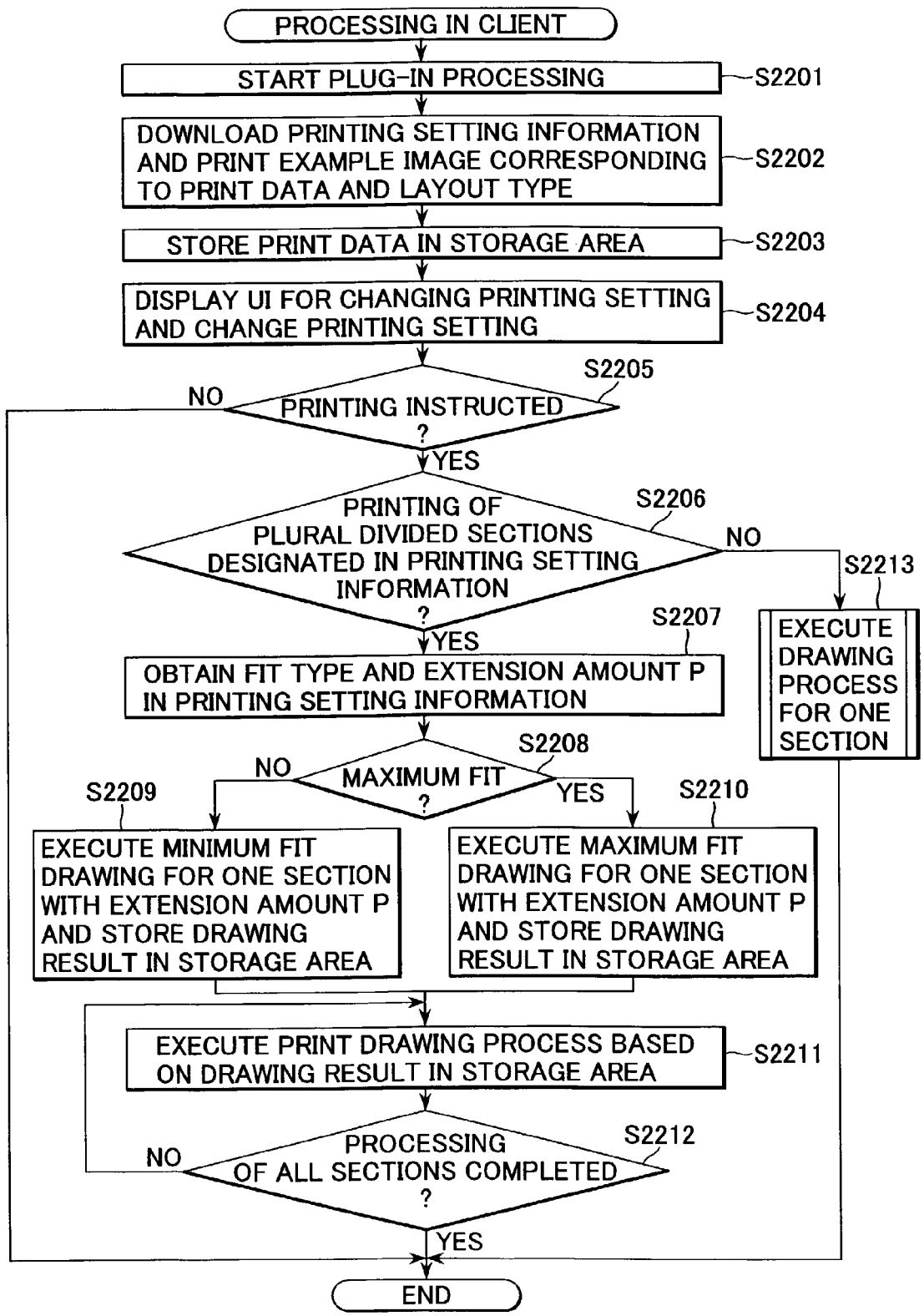
FIG. 22 is a flowchart for explaining a printing process executed in accordance with a plug-in program in the client unit.
Figure 23:
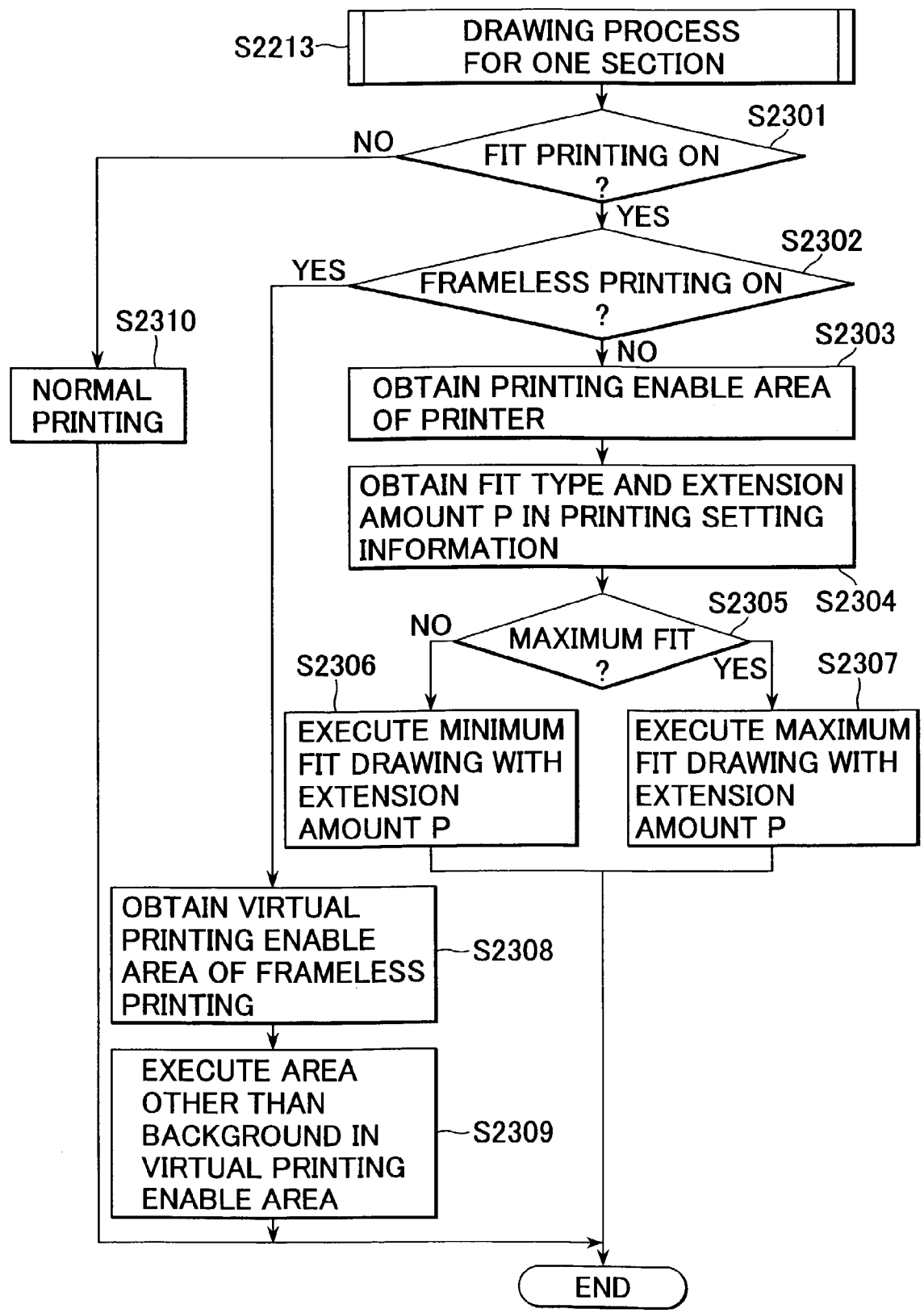
FIG. 23 is a flowchart for explaining a drawing process of fit printing and frameless printing executed in accordance with the plug-in program in the client unit.

Processing procedures in the present invention will be described below with reference to flowcharts in FIGS. 22 and 23. FIGS. 22 and 23 are flowcharts showing a part of the processing executed in the client unit (information processing apparatus) 101 by the plug-in 103.

In step S2201 of FIG. 22, the plug-in 103 is run by clicking the local printing button 501 on the screen of the browser 102 shown in FIG. 5. Subsequent steps S2202 to S2206 are the same as those in FIG. 17 and hence are not explained here.

If it is determined in step S2206 that the plural-section printing is not designated in the printing setting information, the drawing process for one section is executed in step S2213 and the process flow is brought to an end. The drawing process for one section will be explained below in detail with reference to FIG. 23.

If it is determined in step S2206 that the plural-section printing is designated, the plug-in 103 obtains the fit type 1802 and the extension amount P 1803 in the printing setting information 1801 in step S2207. Then, in step S2208, the plug-in 103 checks whether the fit type 1802 in the printing setting information designates maximum fit or minimum fit. If maximum fit is not designated, the process flow advances to step S2209. In step S2209, the plug-in 103 executes minimum fit drawing for one section with the extension amount P as explained above with reference to FIG. 19, and then stores the drawing result in the storage area. If it is determined in step S2208 that maximum fit is designated, the plug-in 103 executes the maximum fit drawing for one section with the extension amount P as explained above with reference to FIG. 19, and then stores the drawing result in the storage area in step S2210. Subsequently, in step S2211, the plug-in 103 executes the drawing process for another section using the stored drawing result for one section. In step S2212, the plug-in 103 checks whether the drawing process for all the sections has been completed, as with the flowchart of FIG. 17. If not completed, the plug-in 103 returns to step S2211 to execute the drawing process for the next section. If the drawing process for all the sections has been completed, the plug-in 103 creates the GDI functions corresponding to the respective drawing results and outputs the created GDI functions to the OS graphic engine (GDI). The printing process in the plug-in 103 is then brought to an end.

Details of the drawing process for one section in step S2213 will now be described in detail with reference to FIG. 23.

In step S2301, the plug-in 103 reads the fit type 1802 in the printing setting information to check whether fit printing is designated. If fit printing is not designated, the plug-in 103 executes the ordinary 1×-magnification printing process for one section in step S2310, following which the process flow is brought to an end. If the fit printing is designated, the plug-in 103 checks in step S2302 whether the frameless printing is designated. This check can be realized by controlling the UI as follows. In the above-mentioned dialog screen of FIG. 12 which is displayed when the printer driver supports an extended API, check boxes for the fit printing and the frameless printing are prepared. Then, when the printer driver is adapted for fit printing and frameless printing, those check boxes are made effective, allowing the user to select fit printing and frameless printing. When fit printing and frameless printing are instructed, details of the instruction are held in the printing setting information.

If it is determined in step S2302 that frameless printing is designated, the plug-in 103 obtains, in step S2308, the virtual printing enable area for frameless printing from the printer driver 104. Then, in step S2309, the plug-in 103 executes the frameless fit printing such that data other than the background is located within the virtual printing enable area, following which the process flow is brought to an end.

If it is determined in step S2302 that frameless printing is not designated, the plug-in 103 obtains, in step S2303, the actual printing enable area of the printer from the printer driver 104. Then, in step S2304, the plug-in 103 obtains the fit type 1802 and the extension amount P 1803 in the printing setting information 1801. In next step S2305, the plug-in 103 checks whether the obtained fit type 1802 designates maximum fit. If maximum fit is not designated, the process flow advances to step S2306 in which the plug-in 103 executes the minimum fit drawing process with the extension amount P. If maximum fit is designated, the plug-in 103 executes the maximum fit drawing process with the extension amount P in step S2307. After the maximum fit drawing process is performed, the plug-in 103 creates the GDI functions corresponding to the drawing results and outputs the created GDI functions to the OS graphic engine (GDI). The drawing process for one section in the plug-in 103 is then brought to an end.

Thus, with this embodiment, including fit printing designating means, means for obtaining the printing enable area of the printer, fit printing drawing means, frameless printing designating means, means for obtaining the virtual printing enable area for the frameless printing, fit printing drawing means for frameless printing, extension amount designating means, extension amount obtaining means, and extension fit drawing means, it is possible to perform printing in which data outside the printing enable area of the printer is completely located within the printing enable area, printing in which data other than the background is printed without missing in the frameless printing, control of the fit type in the fit processing from the WWW server side, and designation of the extension amount in the fit drawing from the WWW server side.

<Explanation of Divided Download>

The download information downloaded from the web server 108 by plug-in 103 is divided into a plurality of files (1407 to 1410) as explained above with reference to FIG. 14. In view of the above, the plug-in 103, according to the present invention, is designed to store files, which have been downloaded, when the download of the download information is canceled halfway, to download subsequent files when the plug-in is run again, and to restore the download information when the file has been all downloaded, so that the process of downloading the download information containing the print target data can be interrupted and resumed.

This embodiment is now explained in connection with the case of dividing the print information to be downloaded into small units, comparing the downloaded print target data with that held in the WWW server 108 when the downloaded print target data is updated, and downloading only different data. Downloading the download information in a divided manner is also advantageous in that, even when the document data held in the WWW server 108 is changed after execution of the download, the latest print target data can be downloaded with minimum download processing.

<Control Flowchart in Client for Divided Download>

Figure 24:
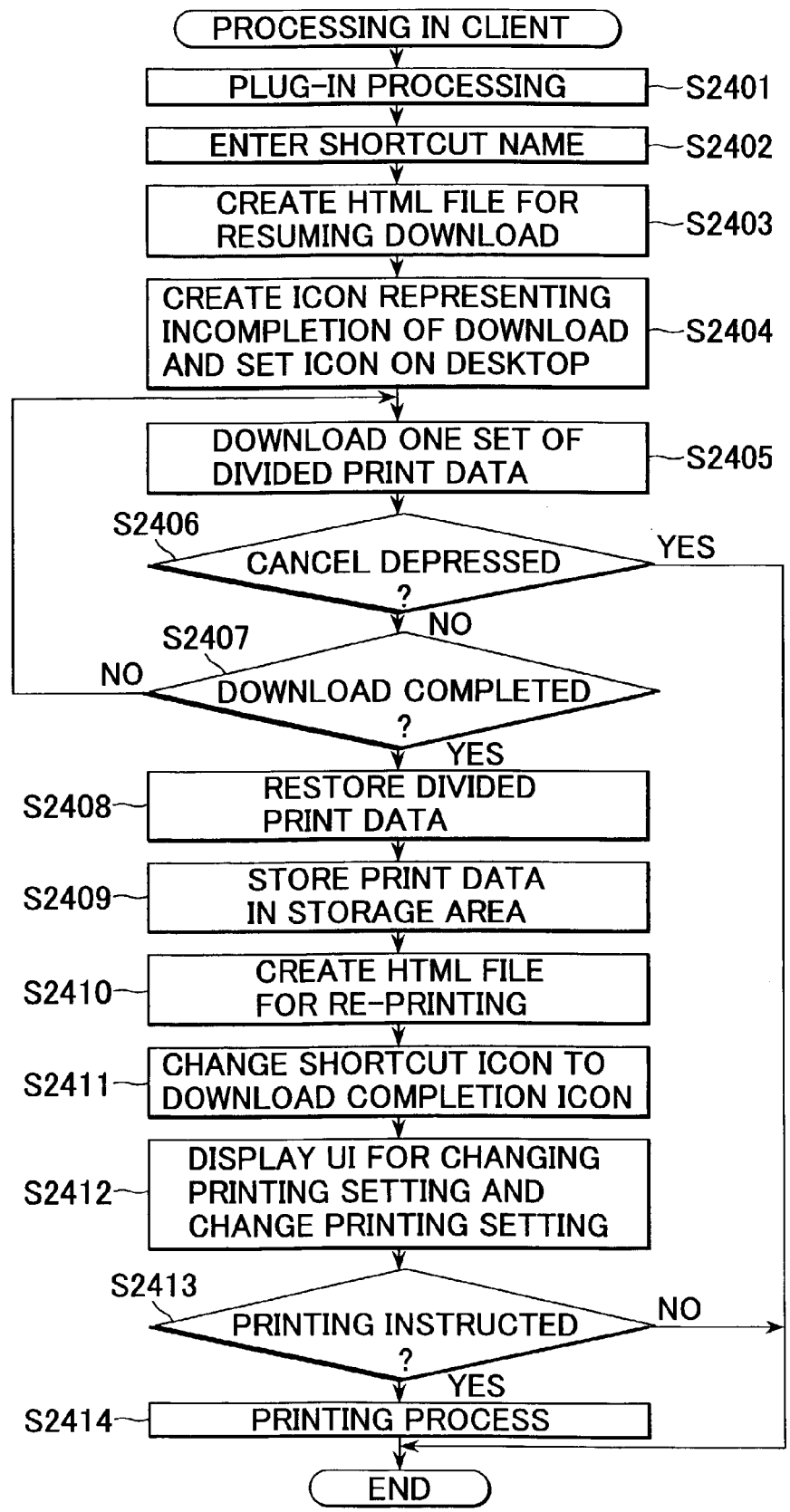
FIG. 24 is a flowchart for explaining details of download processing executed in accordance with the plug-in program in the client unit.

FIGS. 24 to 28 are flowcharts showing the download operation in the client unit. FIG. 24 is a flowchart showing a part of the processing executed in the client unit by the plug-in 103.

Referring to FIG. 24, by clicking the local printing button 501 in FIG. 5, an instruction for downloading the download information is sent to the web server 108 from the browser 102. In response to the download instruction, download processing of the download information is started. With the start of the download processing, the browser 102 runs the plug-in 103 to start plug-in processing in step S2401.

In step S2402, the plug-in 103 displays the dialog screen of FIG. 6 as explained above, thus prompting the user to enter a name of the shortcut to be created. In this step of displaying the dialog screen of FIG. 6, a command sentence given below is read from the resource file 1403: IDD_DIALOG_SHORTCUT_NAME DIALOG DISCARDABLE 0, 0, 220, 100 STYLE DS_MODALFRAME|WS_POPUP|WS_CAPTION|WS_SYSMENU CAPTION "Web CONTENTS PRINTING" FONT 9. "MS UI Gothic" BEGIN LTEXT "ENTER NAME OF SHORTCUT", −1, 9, 7, 156, 16, SS_CENTERIMAGE LTEXT "NAME OF SHORTCUT (&N)", −1, 9, 35, 70, 8 EDITTEXT IDC_EDIT_SHORTCUTNAME, 85,33, 125, 14, ES_AUTOHSCROLL LTEXT "FROM THIS SHORTCUT, SUSPENDED DOWNLOAD CAN BE RESUMED, ¥n OR SAME DATA CAN BE PRINTED AGAIN", −1, 18, 55, 200, 16 DEFPUSHBUTTON "OK", IDOK, 108, 80, 50, 14, WS_TABSTOP|WS_GROUPPUSHBUTTON "CANCEL", IDCANCEL, 158, 80, 50, 14, WS_TABSTOPEND In response to the issuance of the above command sentence from the plug-in 103 to the OS, the dialog screen of FIG. 6 can be displayed.

In next step S2403, the plug-in 103 starts downloading the download information and creates an HTML file, shown in FIG. 8, based on the downloaded HTML page 1410 to be viewed, thereby causing the browser 102 to display the browser display screen of FIG. 8. Subsequently, in step S2404, the plug-in 103 reads an image of a download incompletion icon from the icon image 1404, creates a download incompletion shortcut icon (not shown), and then registers it on the desktop. This download incompletion icon is created in a different image from that of the download completion icon, explained above with reference to FIG. 7, for discrimination between the two icons.

Then, in step S2405, the plug-in 103 downloads one set of the divided download information (print target data) and displays the dialog screen of FIG. 9. In step S2406, the plug-in 103 checks whether the cancel button 902 in FIG. 9 is clicked. If the cancel button 902 is clicked, the download processing is suspended and the process flow is brought to an end. If the cancel button 902 is not clicked, the plug-in 103 checks in step S2407 whether all sets of the divided download information (print target data) have been completely downloaded. If the download has not yet been completed, the plug-in 103 returns to step S2405 to continue the download processing. If the download has been completed, the plug-in 103 restores the divided download information (print target data) in step S2408, and then stores the restored download information in the predetermined storage area in step S2409. Next, in step S2410, the plug-in 103 creates an HTML file (FIG. 8) for reprinting based on the HTML page 1410 to be viewed and the preview image 1409 in the download information as with step S2403, thus causing the browser 102 to display the browser display screen of FIG. 8.

Subsequently, in step S2411, the plug-in 103 changes the download incompletion shortcut icon registered on the desktop to the download completion icon shown in FIG. 7. Then, in step S2412, the plug-in 103 reads a further command sentence from the resource file 1403 and instructs the OS to display the printing-setting and print-instructing dialog box shown in FIG. 10. In step S2413, the plug-in 103 determines whether the print button 1002 is clicked. If printing is not instructed, the process flow is brought to an end. If printing is instructed, the plug-in 103 executes the above-mentioned drawing process in step S2414, following which the printing process is brought to an end.

<Control Flowchart in Client for Divided Download>

Figure 25:
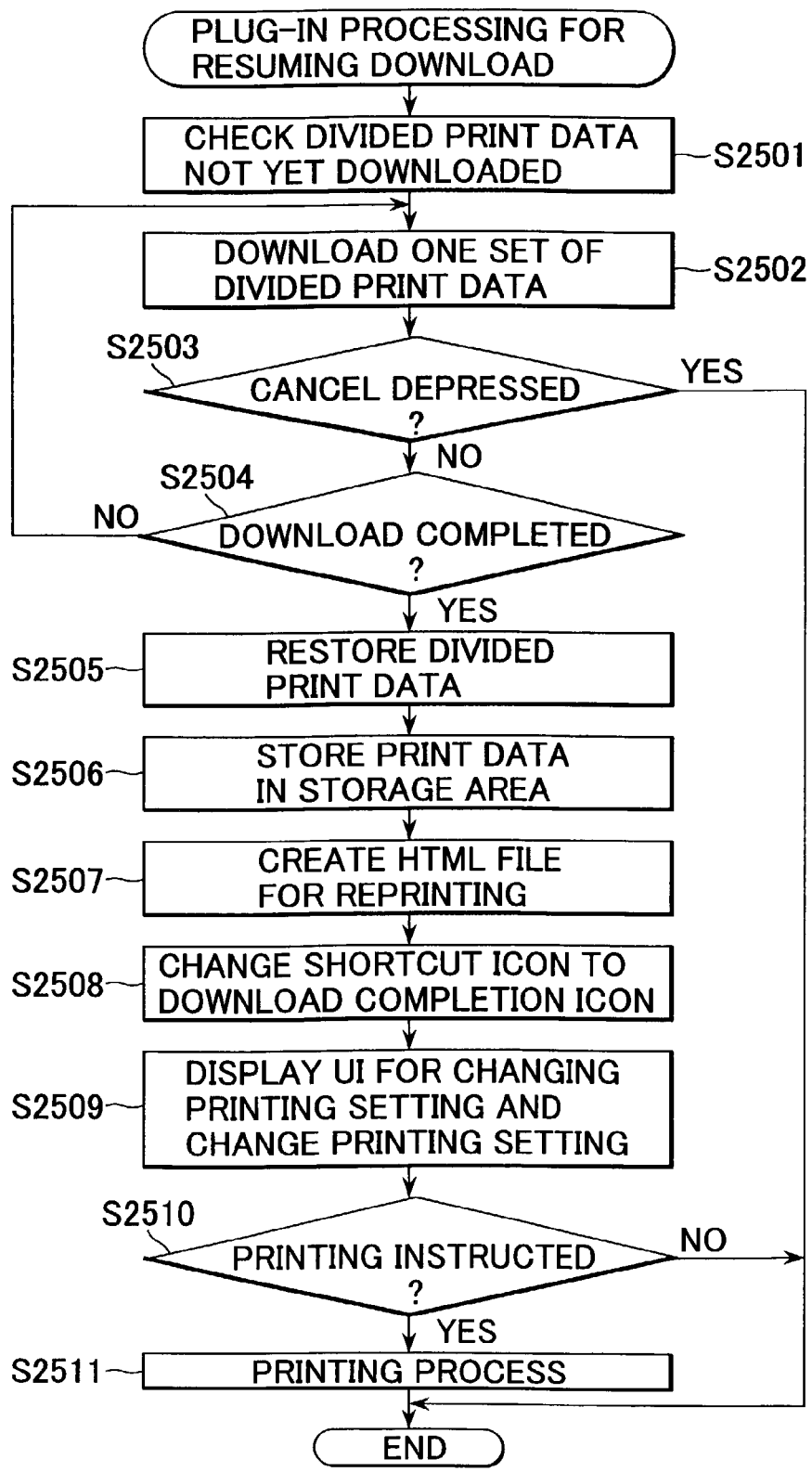
FIG. 25 is a flowchart for explaining re-download processing executed in accordance with the plug-in program in the client unit.

FIG. 25 is a flowchart showing a process of resuming the divided download executed in the client unit with the plug-in 103.

When the user double-clicks the shortcut represented by the download incompletion icon on the desktop, the HTML page 1410 to be viewed, which is a link destination of that shortcut, is read by the WWW browser 102 and the browser display screen of FIG. 8 is displayed. Then, the plug-in 103 is run subsequent to running of the browser 102. The plug-in 103 checks, in step S2501, the print target data that has not yet been downloaded, and proceeds to the download processing.

In step S2502, the plug-in 103 downloads one set of the divided print target data from the web server 108 to the browser 102 and displays the dialog screen of FIG. 9. In step S2503, the plug-in 103 checks whether the cancel button 902 in FIG. 9 is clicked. If the cancel button 902 is clicked, the download is suspended and the process flow is brought to an end. If the cancel button 902 is not clicked, the plug-in 103 checks in step S2504 whether the download has been completed. If the download is not yet completed, the plug-in 103 returns to step S2502 to continue the download. If the download has been completed, the plug-in 103 restores the divided print target data in step S2505, and then stores the restored print target data in the predetermined storage area in step S2506. Next, the plug-in 103 creates an HTML file for reprinting in step S2507, and changes the shortcut icon registered on the desktop to the download completion icon in step S2508. Subsequent processing steps, S2509, S2510, and S2511, are the same as those in FIG. 24 and hence are not explained here.

Thus, a user can instruct re-download of the print target data, as required, by utilizing the HTML page to be viewed in the download information that has been previously downloaded. Accordingly, even when resuming the download after suspension, it is possible to download only the remaining set(s) of the divided print target data.

<Control Flowchart in Client for Reprinting>

Figure 26:
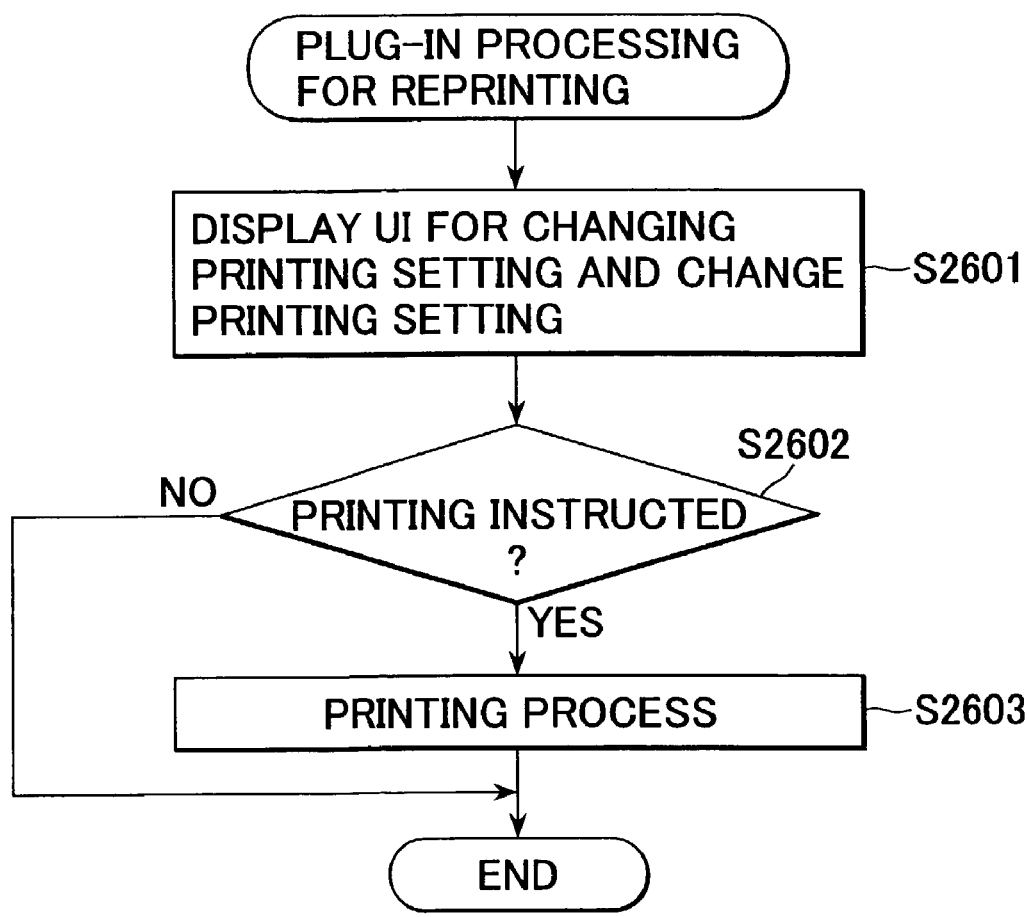
FIG. 26 is a flowchart for explaining a process of changing the printing setting executed in accordance with the plug-in program in the client unit.

FIG. 26 is a flowchart showing a reprinting process executed in the client unit with the plug-in 103.

Figure 7:
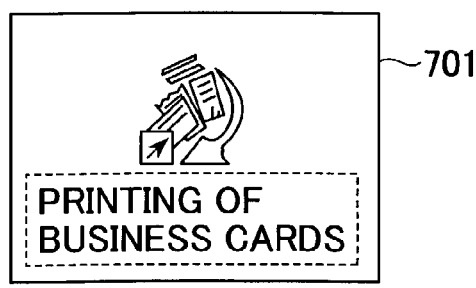
FIG. 7 shows one example of a shortcut icon created on a desktop.

When the user double-clicks the shortcut represented by the download completion icon, shown in FIG. 7, on the desktop using the pointer, the HTML page 1410 to be viewed, which is a link destination of that shortcut, is read by the WWW browser 102 and the browser display screen of FIG. 8 is displayed. Then, when the print button 802 is clicked, the browser display screen is changed to one for printing in which DLL execution commands are described in a source program. The DLL file 1401, i.e., the plug-in 103 is run in accordance with the DLL execution commands in the browser display screen.

In step S2601, the plug-in 103 displays the printing-setting and print-instructing dialog box shown in FIG. 10. In step S2602, the plug-in 103 determines whether the print button 1002 is clicked. If it is determined that the cancel button 1004 is clicked and the printing is not instructed, the process flow is brought to an end. If it is determined that the print button 1002 is clicked and the printing is instructed, the plug-in 103 converts, in step S2603, the print target data into drawing functions (GDI functions) in a similar manner to that explained above, and outputs the created GDI functions to the OS graphic engine (GDI), following which the printing process with the plug-in 103 is brought to an end. Thereafter, as explained above, the GDI functions output to the OS graphic engine is converted DDI functions which are output to the printer driver 104. The printer driver 104 converts the received DDI functions into print data (printing job) described in printer control language interpretable by the printer 105, and the print data is sent to the printer 105 via the OS print spooler for executing the printing process.

Thus, by double-clicking the shortcut icon created on the desktop to run, the print target data having been already downloaded can be reprinted as it is by using the plug-in 103. This eliminates the necessity of downloading the print target data from the web server 108 for each operation of printing. Consequently, the communication cost is reduced and the burden imposed on users is also reduced.

<Control Flowchart in Client for Re-Download>

Figure 27:
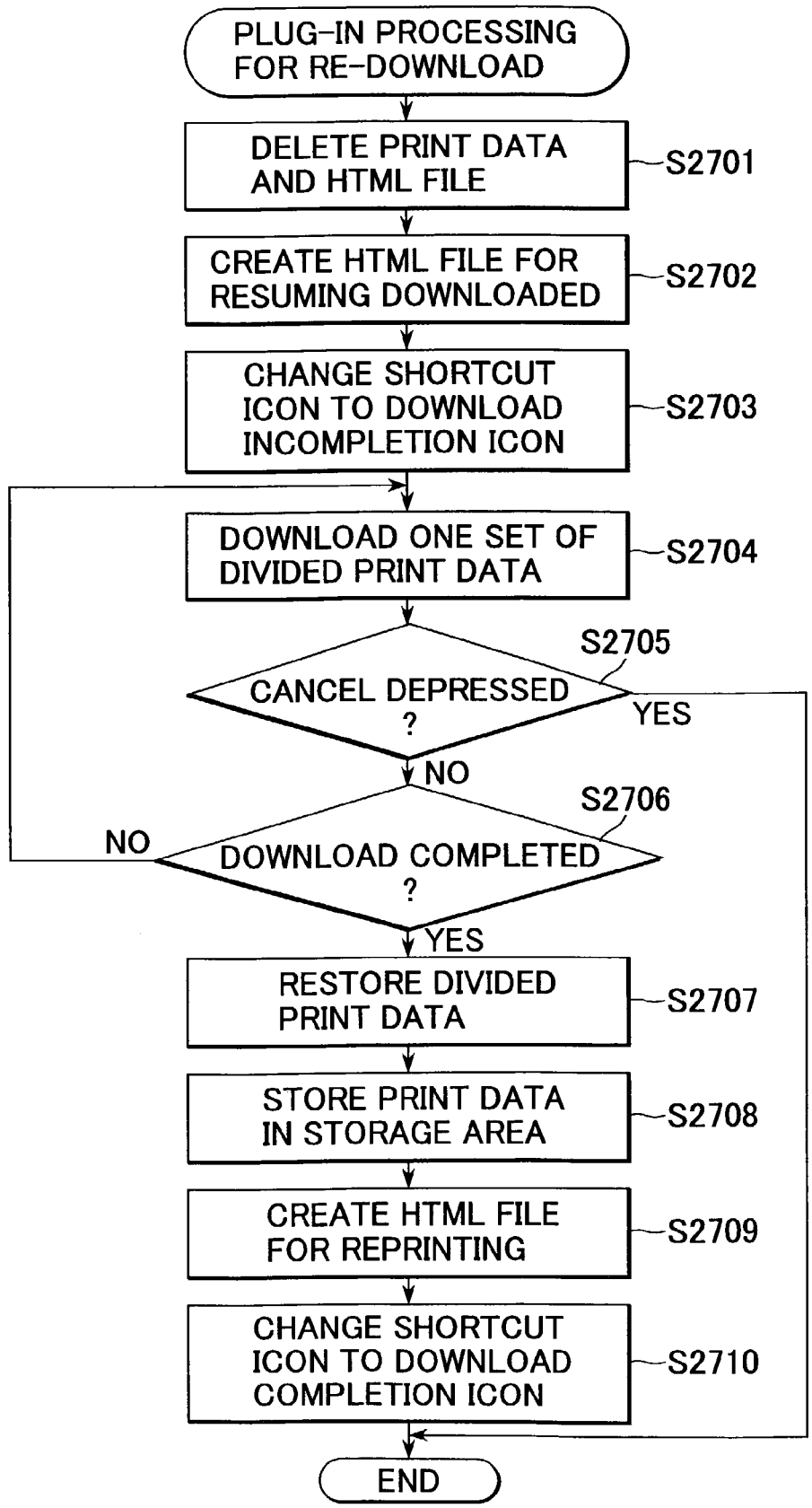
FIG. 27 is a flowchart for explaining an incomplete process of division download executed in accordance with the plug-in program in the client unit.

FIG. 27 is a flowchart showing re-download processing executed in the client unit by the plug-in 103.

When the user double-clicks the shortcut icon represented by the download completion icon on the desktop, the WWW browser 102 is run and the browser display screen of FIG. 8 is displayed as explained above. Then, when the re-download button 804 is clicked, the plug-in 103 is run. The plug-in 103 deletes, in step S2701, the files containing the print target data 1407, the printing setting information 1408, the preview image 1409, and the HTML page 1410 to be viewed, which has been downloaded in advance. Then, the plug-in 103 creates an HTML file for resuming the download in step S2702, and changes the shortcut icon registered on the desktop to the download incompletion icon in step S2703. An image of the download incompletion icon is preferably one containing an exclamation mark (!) so that the user can easily recognize the state where the print target data is not present. Such an image of the download incompletion icon is also held in the icon image 1404 of the plug-in file 1401. Additionally, the HTML file for resuming the download, which is created by the plug-in 103, describes therein the URL (including the bus to the file of the corresponding data 109 in the web server 108) for the print target data to be obtained.

Subsequently, the plug-in 103 advances to the download processing. In step S2704, the plug-in 103 sends an instruction for acquiring the file corresponding to the URL, which is described in the HTML file for resuming the download, to the web server 108 via the browser 102. In response to the file acquiring instruction, one of a plurality of files (such as the print target data and the HTML page to be viewed) for the download information is downloaded, and the dialog box of FIG. 9 is displayed. In step S2705, the plug-in 103 checks whether the cancel button 902 is clicked. If the cancel button 902 is clicked, the download is suspended and the process flow is brought to an end. If the cancel button 902 is not clicked, the plug-in 103 checks in step S2706 whether the download has been completed, by determining whether the download information to be downloaded has been obtained. If the download has not yet been completed, the plug-in 103 returns to step S2704 to continue the download. If the download has been completed, the plug-in 103 restores the respective files downloaded in a divided manner in step S2707, and then stores the download information containing the print target data in the predetermined storage area in step S2708. Next, in step S2709, the plug-in 103 causes the browser 102 to display the HTML file (FIG. 8) for reprinting. In step S2710, the plug-in 103 reads the icon image 1404 and changes the shortcut icon registered on the desktop from the download incompletion icon to the download completion, following which the process flow is brought to an end.

Thus, with this embodiment, after deleting the print target data, the icon is changed to the state indicating that the download has not yet been completed. The print target data is automatically re-downloaded by accessing the URL described in the HTML file for resuming the download. After completion of the re-download, the icon is changed to the state indicating that the download is completed. Therefore, the user is no longer required to select the document data obtained from the top page of the web server 108 via the browser 102, and the print target data in the latest version can be obtained from the web server with simple operation.

<Control Flowchart in Client for Update>

Figure 28:
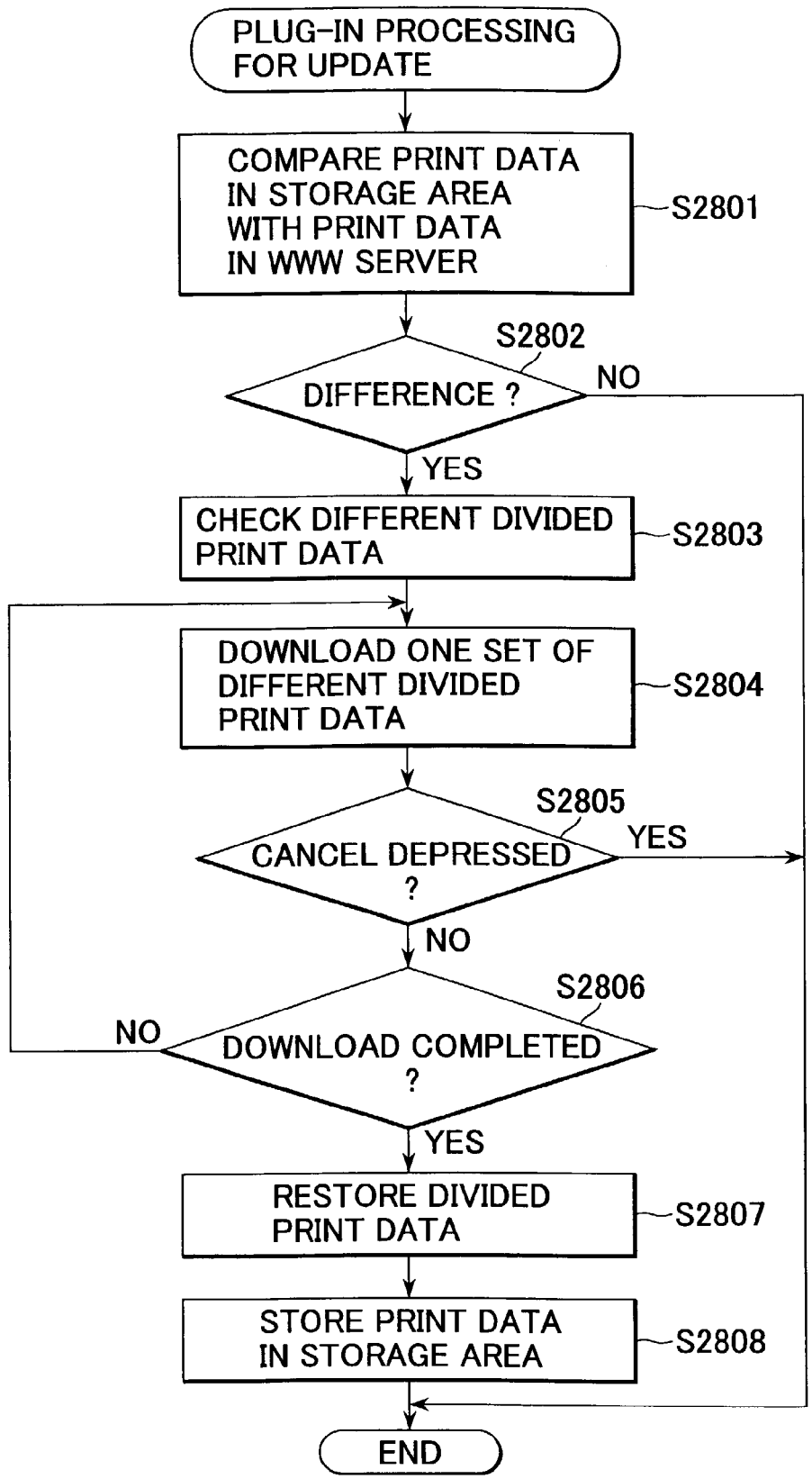
FIG. 28 is a flowchart for explaining a restoring process executed in accordance with the plug-in program.

FIG. 28 is a flowchart showing update processing executed in the client unit by the plug-in 103.

When the user double-clicks the shortcut represented by the download completion icon on the desktop, the WWW browser 102 is run and a browser display screen (not shown) is displayed. This browser display screen is substantially the same as that shown in FIG. 8 except for that the re-download button 803 is replaced with an update button and the re-download and print button 804 is replaced with an update and print button. Upon clicking the update button, the plug-in 103 is run.

In step S2801, the plug-in 103 accesses the web server 108 via the browser 102 and compares the print target data 1407 in the storage area with the print target data 110 in the WWW server 108. Then, in step S2802, the plug-in 103 determines whether there is a difference between the two kinds of print target data. If it is determined that there is no difference, the process flow is brought to an end. If it is determined that there is a difference, the plug-in 103 checks the different divided print target data in step S2803, and then advances to the download processing. In step S2804, the plug-in 103 downloads one set of the different divided print target data and displays the dialog screen of FIG. 9. In step S2805, the plug-in 103 checks whether the cancel button 902 is clicked. If the cancel button 902 is clicked, the download is suspended and the process flow is brought to an end. If the cancel button 902 is not clicked, the plug-in 103 checks in step S2806 whether the download has been completed. If the download has not yet been completed, the plug-in 103 returns to step S2804 to continue the download. If the download has been completed, the plug-in 103 restores the divided print target data in step S2807, and then stores the thus-obtained print target data in the predetermined storage area in step S2808, following which the process flow is brought to an end.

Thus, because the plug-in 103 compares the print target data already stored in the storage area and the print target data preserved in the web server 108 and downloads the print target data if there is a difference, a communication load due to wasteful download can be avoided.

<Details of Order Printing>

An order processing for online printing service via the Internet will be described below with reference to FIGS. 29 to 31.

When the user clicks the order printing button 502 on the browser display screen of FIG. 5, the browser 102 sends an instruction for order printing to the web server 108. In response to the instruction for order printing, the web server 108 sends a structured document in HTML form, for example, shown in FIG. 29, to the browser 102, whereupon the browser 102 displays a browser display screen of FIG. 29.

Referring to FIG. 29, numeral 2901 denotes a user registration button. The user can perform user registration by clicking the user registration button 2901. User registration is required in advance when the user utilizes the order printing system. Users who have already made the user registration are prompted to enter the user ID and the password in a text box 2902. Thereafter, by clicking the OK button, the browser 102 displays a browser display screen of FIG. 30.

FIG. 30 shows a browser display screen for setting printing details. On the browser display screen of FIG. 30, the user can designate the number of prints by which the document data having details selected and set on the browser display screens of FIGS. 3 to 5 is to be printed. Also, the user can designate delivery service. By entering the address, the name of the recipient, and the phone number, i.e., a destination of the delivery of the prints, in a text box 3001, the prints can be delivered to the destination entered. Upon clicking the OK button present in a lower portion of the browser display screen of FIG. 30, the browser 102 displays a browser display screen of FIG. 31.

FIG. 31 shows a browser display screen for confirming the charge estimation and selecting the payment method. On the browser display screen of FIG. 31, the user can confirm the charge estimation. Also, using a pull-down menu 3101, the user can select the payment method, i.e., what kind of credit card to use for payment. Thus, by clicking an order button in the lower portion of the browser display screen of FIG. 31, after confirming the charge estimation and selecting the payment method, a normal printing order can be issued via the Internet. Processing of the printing order via the Internet is not described here because it is well known.

Conventionally, in the case of instructing printing of document data on a web server connected via the Internet, order printing can be performed only by utilizing an online print service. In contrast, according to the present invention, the local printing button and the order printing button are provided in the web server page for designating the printing method. When the local printing button is clicked, the print target data is downloaded using the plug-in of the browser, and the plug-in runs the printer driver via the OS for printing the downloaded data. As a result, the online order printing and the local printing can be designated in response to an instruction from the browser and convenience in use can be improved.

A configuration of a printing control program, i.e., a plug-in readable by a printing system, to which the information processing apparatus according to the present invention can be applied, will be described with reference to a memory map shown in FIG. 32. FIG. 32 is a table for explaining a memory map of a storage medium storing various data processing programs readable by a printing system, to which the information processing apparatus according to the present invention can be applied.

Though not shown, in particular, the storage medium also stores information for managing a group of programs stored in the storage medium, such as version information and the creator's name, and may also store information depending on the OS, etc. on the program reading side, e.g., icons for identifying the programs.

Further, data belonging to the various programs is managed in respective directories. In some cases, the storage medium stores a program for installing the various programs in a computer, a decompressing program when the installed programs are compressed, etc.

The present invention involves the case in which software programs for realizing the above-described functions of the embodiment (programs corresponding to the flowcharts executed in the embodiment) are directly or remotely supplied to a system or apparatus, and a computer in the system or apparatus reads and executes the supplied programs, thereby realizing the above-described functions. In such a case, there is no limitation in the software form so long as the necessary program functions are provided.

For example, program codes installed in a computer for realizing the functions and processing of the present invention in the computer serve in themselves to realize the present invention. In other words, the present invention involves computer programs for operating the computer to realize the functions and processing of the present invention.

In that case, there is no limitation in the program form, including object codes, programs executed by an interpreter, script data supplied to OS, etc., so long as the necessary program functions are provided.

Storage mediums for supplying programs may be, e.g., floppy disks, hard disks, optical disks, magneto-optical disks, MOs, CD-ROMs, CD-Rs, CD-RWs, magnetic tapes, nonvolatile memory cards, ROMs, and DVDs (such as DVD-ROMs and DVD-RS).

A method of supplying programs can be realized by connecting a home page on the Internet using a browser in a client computer, and downloading the computer programs themselves of the present invention or a compressed file including the automatic installation function from the home page in a storage medium, such as a hard disk. Alternatively, the necessary functions can also be realized by dividing program codes constituting the programs of the present invention into a plurality of files, and downloading those files from different home pages. In other words, a WWW server for downloading program files, which cause a computer to realize the functions and processing of the present invention, to a plurality of users is also involved in embodiments of the present invention.

Further, the functions and processing of the present invention can also be realized by distributing, to users, the programs of the present invention encrypted and stored in a storage medium, such as a CD-ROM, downloading key information decrypting the encrypted programs to users who are qualified with predetermined conditions, from a home page via the Internet, and executing the encrypted programs with the key information for installing the programs in a computer.

Moreover, the functions of the above-described embodiment are realized not only by a computer executing the programs read out of a storage medium, but also by an OS or the like which is running on a computer and executes a part or the whole of the actual processing in accordance with commands from the programs, thereby realizing the functions of the above-described embodiments through the execution of the processing.

Additionally, the present invention involves a case in which programs read out of a storage medium are written in a memory provided in a function add-on board inserted in a computer or a function add-on unit connected to the computer, and a CPU or the like incorporated in the function add-on board or unit executes a part or the whole of the actual processing in accordance with commands from the programs, thereby realizing the functions of the above-described embodiment through the execution of the processing.

With the embodiment of the present invention, as described above, the printing setting information corresponding to the designated layout type is downloaded from the WWW server, and the printing process is executed in accordance with the downloaded printing setting information. When performing printing in plural divided sections of one sheet, it is possible to prevent an increase in the amount of print target data, and to reduce the time required for transferring the print target data.

Also, when performing printing in plural divided sections of one sheet, not only the drawing time but also the printing time can be reduced by copying the drawing result for one section in drawing of another section.

Since the layout type designated on the WWW server can be displayed during initiation of the plug-in of the WWW browser in the client unit, the user is not required to memorize the layout type that has been designated beforehand.

Further, the print example image corresponding to the layout type designated on the WWW server can be transferred to the client unit and can be displayed during the plug-in processing of the WWW browser. Therefore, the user can visually confirm the layout type.

By transferring the layout type name and the print example image from the WWW server for use in the client unit, there is no necessity for updating the plug-in program even when a new type is added to a layout type designating unit in the WWW server.

An object, which is not printed, usually because it is positioned near edges of a sheet outside the printing enable area of a printer, can be arranged within the printing enable area, and therefore all data can be printed.

The print target data other than the background, which extends outward on a sheet with ordinary frameless printing, can be arranged within the sheet, and therefore an added-value of frameless printing can be increased.

By designating the fit type in the printing setting information transferred from the WWW server, the operation of fit processing of the plug-in program can be controlled from the WWW server side so that the fit type can be changed, depending on data to be printed. This feature is effective, by way of example, in the following case.

Photo data, for example, is generally printed by frameless printing. For realizing frameless printing of such data, it is permitted that some information outside a sheet is discarded as a result of trimming. In the case of printing a business card or a post card, however, characters are sometimes present very close to edges of a sheet and a value of the business card or the post card is lost if those characters are partly cut off at the edge of the sheet. In view of those situations, the fit type can be changed depending on the contents of a print as follows. When printing a photo, the maximum fit is designated to realize frameless printing, although a part of information extends outward of the sheet. When printing a business card or a post card, the minimum fit is designated so that all the original data is located within the sheet.

In addition, by making a drawing of data with a designated amount of extension from the fit area, the following advantage is obtained. In the case of frameless printing on a sheet that has a tear-off line, such as perforations, formed beforehand, the reliability of frameless printing can be improved even when the data is not always precisely printed in actually drawn positions because of feed errors during the printing and errors in cutting of sheets.

While the present invention has been described with reference to what are presently considered to be the preferred embodiments, it is to be understood that the invention is not limited to the disclosed embodiments. On the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. A method used in an information processing apparatus which is connected to a printer and is able to communicate with a web server apparatus via network, the method comprising the steps of:

transmitting a printing instruction including setting of a print layout type to the web server apparatus;

downloading printing setup information corresponding to the print layout type and print target data from the web server apparatus;

creating and displaying a shortcut icon on a screen when the downloading step is completed;

storing the printing setup information and the print target data;

executing a printing job of the print target data based on the printing setup information;

deleting the stored printing setup information and the stored print target data, when the shortcut icon is clicked;

creating a new file including an address of the print target data;

changing the shortcut icon to an incompletion icon, which has a different design from the shortcut icon;

re-downloading the print target data based on the address, when the incompletion icon is clicked; and restoring the print target data by using the downloaded different print target data.

2. An information processing apparatus which is connected to a printer and is able to communicate with a web server apparatus via network, the apparatus comprising:

transmitting means for transmitting a printing instruction including setting of a print layout type to the web server apparatus;

first downloading means for downloading printing setup information corresponding to the print layout type and print target data from the web server apparatus;

creating and display means for displaying a shortcut icon on a screen when the downloading step is completed;

storing means for storing the printing setup information and the print target data;

executing means for executing a printing job of the print target data based on the printing setup information;

deleting means for deleting the stored printing setup information and the stored print target data, when the shortcut icon is clicked;

creating means for creating a new file including an address of the print target data;

changing means for changing the shortcut icon to an incompletion icon, which has a different design from the shortcut icon;

re-downloading means for re-downloading the print target data based on the address, when the incompletion icon is clicked; and restoring means for restoring the print target data by using the downloaded different print target data.

3. An information processing apparatus according to claim 2, wherein when the print layout type contained in the printing instruction designates plural-section printing, a drawing and outputting means creates drawing data by making a drawing of the print target data for one section and copying a drawing result to other sections.

4. An information processing apparatus according to claim 2, further comprising storing means for storing the print target data downloaded by said downloading means in a predetermined storage area, wherein whenever printing of the print target data is instructed via a browser display screen downloaded from said web server apparatus, a drawing and outputting means reads the print target data stored in the predetermined storage area and executes a drawing process, and the drawing data is output via said drawing section to said printer driver adapted for said printer, thereby creating the print data.

5. A computer-readable medium storing a computer-executable program for a method used in an information processing apparatus which is connected to a printer and is able to communicate with a web server apparatus via network, the method comprising the steps of:

transmitting a printing instruction including setting of a print layout type to the web server apparatus;

downloading printing setup information corresponding to the print layout type and print target data from the web server apparatus;

creating and displaying a shortcut icon on a screen when the downloading step is completed;

storing the printing setup information and the restored print target data;

executing a printing job of the print target data based on the printing setup information;

deleting means for deleting the stored printing setup information and the stored print target data, when the shortcut icon is clicked;

creating means for creating a new file including an address of the print target data;

changing means for changing the shortcut icon to an incompletion icon, which has a different design from the shortcut icon;

re-downloading means for re-downloading the print target data based on the address, when the incompletion icon is clicked; and restoring the print target data by using the downloaded different print target data.

* * * * *